(12) United States Patent
Amada et al.

(10) Patent No.: US 6,771,300 B2
(45) Date of Patent: Aug. 3, 2004

(54) MULTI-BEAM SCANNING DEVICE

(75) Inventors: Taku Amada, Yokohama (JP); Naoki Miyatake, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 328 days.

(21) Appl. No.: 10/090,824

(22) Filed: Mar. 6, 2002

(65) Prior Publication Data

US 2002/0149666 A1 Oct. 17, 2002

(30) Foreign Application Priority Data

Mar. 7, 2001 (JP) ........................................ 2001-062928
Jul. 3, 2001 (JP) ........................................ 2001-202309
Mar. 6, 2002 (JP) ........................................ 2002-059853

(51) Int. Cl.$^7$ ............................. B41J 15/14; B41J 27/00
(52) U.S. Cl. ....................................................... 347/241
(58) Field of Search ................................ 347/241, 233, 347/234, 235, 236, 237, 238, 239, 240; 359/237, 248

(56) References Cited

U.S. PATENT DOCUMENTS 5,952,649 A  9/1999 Amada

FOREIGN PATENT DOCUMENTS

JP  2000-75227  3/2000
JP  2000-255097  9/2000

OTHER PUBLICATIONS

U.S. patent application Ser. No. 09/833,821, filed Apr. 13, 2001, pending.
U.S. patent application Ser. No. 10/090,824, filed Mar. 6, 2002, Amada et al.
U.S. patent application Ser. No. 10/347,746, filed Jan. 22, 2003, Suzuki et al.
U.S. patent application Ser. No. 10/090,824, filed Mar. 6, 2002, Amada et al.
U.S. patent application Ser. No. 10/386,654, Mar. 13, 2003, Amada et al.
U.S. patent application Ser. No. 10/090,824, filed Mar. 6, 2002, Amada et al.
U.S. patent application Ser. No. 10/395,128, filed Mar. 25, 2003, Hayashi et al.
U.S. patent application Ser. No. 10/090,824, filed Mar. 6, 2002, Amada et al.
U.S. patent application Ser. No. 10/382,530, filed Mar. 7, 2003, Hayashi et al.
U.S. patent application Ser. No. 10/090,824, filed Mar. 6, 2002, Amada et al.
U.S. patent application Ser. No. 10/421,786, filed Apr. 24, 2003, Atsuumi et al.
U.S. patent application Ser. No. 10/090,824, filed Mar. 6, 2002, Amada et al.
U.S. patent application Ser. No. 10/609,577, filed Jul. 1, 2003, Nakajima et al.
U.S. patent application Ser. No. 10/090,824, filed Mar. 6, 2002, Amada et al.
U.S. patent application Ser. No. 10/617,033, filed Jul. 11, 2003, Amada et al.

*Primary Examiner*—Raquel Yvette Gordon
(74) *Attorney, Agent, or Firm*—Oblon, Spivak, McClelland, Maier & Neustadt, P.C.

(57) ABSTRACT

A light-source unit includes two LD arrays, each comprising four light-emitting points, a corresponding two coupling lenses coupling laser beams emitted from the two LD arrays, and a holding member integrally holding these LD arrays and coupling lenses rotatably approximately about optical axes on the laser beams are provided. Further, a scanning optical system is provided for deflecting the laser beams emitted from the light-source unit and imaging them onto the to-be-scanned surface.

46 Claims, 25 Drawing Sheets

LIGHT SOURCE $qY = q\sin\phi$ $qZ = q\cos\phi$

IMAGE SURFACE

QY

QZ (1200dpi)

(600dpi)

FIG.25

| SCAN LINE INTERVAL | d | [μm] | 21.2 |
|---|---|---|---|
| NUMBER OF LIGHT EMITTING POINTS ON EACH LD ARRAY | n | | 4 |
| LIGHT EMITTING POINT INTERVAL | q | [μm] | 14 |
| LD ARRAY ARRANGEMENT ANGLE | φ | [°] | 70 |
| MAIN SCAN DIRECTION MAGNIFICATION | mY | [TIMES] | 15 |
| SUB-SCAN DIRECTION MAGNIFICATION | mZ | [TIMES] | 8.85 |
| FOCAL LENGTH OF COUPLING LENS | fcol | [mm] | 15 |
| CROSSING ANGLE | 2θ | [°] | 5 |
| FOCAL LENGTH OF SCANNING OPTICAL SYSTEM (ALONG MAIN SCAN DIRECTION) | FY | [mm] | 225 |

FIG.26

| SCAN LINE INTERVAL | d | [μm] | 21.2 |
|---|---|---|---|
| NUMBER OF LIGHT EMITTING POINTS ON EACH LD ARRAY | n | | 4 |
| LIGHT EMITTING POINT INTERVAL | q | [μm] | 14 |
| LD ARRAY ARRANGEMENT ANGLE | φ | [°] | 0 |
| MAIN SCAN DIRECTION MAGNIFICATION | mY | [TIMES] | 15 |
| SUB-SCAN DIRECTION MAGNIFICATION | mZ | [TIMES] | 3.03 |
| FOCAL LENGTH OF COUPLING LENS | fcol | [mm] | 15 |
| CROSSING ANGLE | 2θ | [°] | 3 |

MULTI-BEAM SCANNING DEVICE

BACKGROUND OF THE INVENTION

1. Field of the Invention

The present invention relates to a multi-beam scanning device used in a laser writing optical system of an image formation apparatus, such as a color laser printer, a digital copier, or the like.

2. Description of the Related Art

In a multi-beam scanning device which uses two semiconductor laser arrays as light sources, a method for adjusting the sub-scanning beam pitch on a to-be-scanned body such as a photoconductor drum, is proposed by Japanese laid-open patent application No. 2000-75227, as an example of adjusting the sub-scanning beam pitch on a to-be-scanned body such as a photoconductor drum.

According to the above-mentioned publication, a light source unit is provided which includes a holding member which holds integrally two semiconductor laser arrays together with two coupling lenses, and, the sub-scanning beam pitch on a to-be-scanned body is adjusted as this light source unit is rotated about a rotation axis which corresponds to the optical axis of the optical system.

Moreover, according to the same publication, even in a case of a type in which beams emitted from the two semiconductor laser arrays are combined by utilizing polarization characteristic of the laser, the above-mentioned method can also be applied for precisely adjusting the sub-scanning pitch on the to-be-scanned surface.

However, according to the above-mentioned art, there is a possibility that the main scanning beam pitch is also changed due to the rotation of the light source unit, and, also, when the mounting precision of the scanning optical system or the mounting precision of the light source unit may not be sufficiently secured, the state of the beam arrangement before the adjustment is not satisfactory one, and, as a result, there is a possibility that the predetermined value on the sub-scanning beam pitch cannot be obtained only by the rotation of the light source unit.

Therefore, when an electrostatic latent image is formed on a photoconductor drum through the multi-beam scanning device having such a light source unit, and then, a toner image is obtained from the latent image through a well-known development and fixing processes, the thus-obtained final image may be degraded such as fluctuation on vertical lines or the like, due to the change in the main scanning beam pitch after the sub-scanning beam pitch adjustment and/or insufficient state of beam arrangement before the sub-scanning beam pitch adjustment.

SUMMARY OF THE INVENTION

The present invention has been devised in order to solve these problems, and an object of the present invention is to provide a multi-beam scanning device by which a satisfactory final image can be obtained in an image formation apparatus employing this scanning device even after the sub-scanning beam pitch adjustment has been made.

A multi-beam scanning device according to the present invention, scanning a to-be-scanned surface with a plurality of laser beams simultaneously, comprises:

a light-source unit comprising a plurality of laser arrays, each comprising a plurality of light-emitting points, a corresponding plurality of coupling lenses coupling laser beams emitted from the plurality of laser arrays, and a holding member integrally holding the plurality of laser arrays and plurality of coupling lenses rotatably approximately about optical axes on the laser beams; and a scanning optical system deflecting the laser beams emitted from the light-source unit and imaging them onto the to-be-scanned surface.

There, the light-source unit and scanning optical system are configured so that the following equation be satisfied:

$$AY = |q \times \cos \phi \times mY \times (n-1)/(2 \times fcol \times \tan \theta \times \cos \gamma \times mZ)| \leq 0.1$$

where:

n denotes the number of light-emitting points on each LD array;

q denotes an interval between each adjacent ones of the light-emitting points;

$\phi$ denotes an inclination angle of each laser array with respect to a sub-scanning direction;

mY denotes a magnification of the scanning optical system on main scanning direction;

mZ denotes a magnification of the scanning optical system on sub-scanning direction;

fcol denotes the focal length of each coupling lens;

$\theta$ denotes half a crossing angle at which the laser beams emitted from the plurality of laser arrays cross therebetween;

$\gamma$ denotes a maximum required rotational angle of the light-source unit in case of adjustment.

Further or alternatively, in the multi-beam scanning device, the light-source unit and scanning optical system are configured so that the following equation be satisfied:

$$AZ = |q \times \sine \phi \times (n-1)/(2 \times fcol \times \tan \theta \times \cos \gamma)| \leq 0.1$$

Thereby, even in case, an error in scanning line interval occurring due to optical-axis manufacture/assembling error or so between the plurality of laser arrays should be corrected by rotating ($\gamma$ rotation) the holding unit in an adjustment work, a newly occurring scanning line interval error along the sub-scanning direction and/or beam spot interval error along the main scanning direction due to the above-mentioned adjustment work can be controlled to be made within a permissible range.

A multi-beam scanning device according to another aspect of the present invention, scanning a to-be-scanned surface with a plurality of laser beams simultaneously, comprises:

a light-source unit comprising a plurality of laser arrays, each comprising a plurality of light-emitting points, a corresponding plurality of coupling lenses coupling laser beams emitted from the plurality of laser arrays, and a holding member integrally holding the plurality of laser arrays and plurality of coupling lenses rotatably approximately about optical axes on the laser beams;

a scanning optical system deflecting the laser beams emitted from the light-source unit and imaging them onto the to-be-scanned surface; and a part switching a scanning density on the to-be-scanned surface by rotating the light-source unit approximately about the optical axes on the laser beams emitted therefrom.

Thereby, even with a simple arrangement, it is possible to easily perform switching of the scanning density on the to-be-scanned surface in the multi-beam scanning device employing the plurality of laser arrays by appropriately rotating (γ rotation) the holding member integrally holding these laser arrays.

Further, it is preferably that the light-source unit and scanning optical system are configured so that the following formula be satisfied:

$$\Delta RY = |\{(n-1)\times(2n-1)/2\}\times\{(q\times\cos\phi\times mY\times d)/(fcol\times\tan\theta\times mZ)\}| \leq d/4$$

where:
- d denotes scanning line interval;
- n denotes the number of light-emitting points on each laser array;
- q denotes an interval between each adjacent ones of the light-emitting points;
- φ denotes an inclination angle of each laser array with respect to a sub-scanning direction;
- mY denotes a magnification of the scanning optical system on main scanning direction;
- mZ denotes a magnification of the scanning optical system oh sub-scanning direction;
- fcol denotes the focal length of each coupling lens;
- θ denotes half a crossing angle at which the laser beams emitted from the plurality of laser arrays cross therebetween;
- ΔRY denotes the main-scanning-directional component of beam-spot interval between both ends of beam spots on the to-be-scanned surface from each laser array.

Further or alternatively, it is preferable that the light-source unit and scanning optical system are configured so that the following formula be satisfied:

$$\Delta RZ = |\{(n-1)\times(2n-1)/2\}\times\{(q\times\sin\phi\times d)/(fcol\times\tan\theta)\}| \leq d/4$$

where ΔRZ denotes the sub-scanning-directional component of beam-spot interval between both ends of beam spots on the to-be-scanned surface from each laser array.

Thereby, it is possible to control within a predetermined range the beam spot interval error on the to-be-scanned surface occurring due to the γ rotation of the holding member for the switching of the scanning density on the to-be-scanned surface.

BRIEF DESCRIPTION OF THE DRAWINGS

Other objects and further features of the present invention will become more apparent from the following detailed description when read in conjunction with the following accompanying drawings:

FIG. 25 shows a specification of the third embodiment of the present invention;

FIG. 26 show s a specification of a fourth embodiment of the present invention.

DESCRIPTION OF THE PREFERRED EMBODIMENTS

Figure 1:
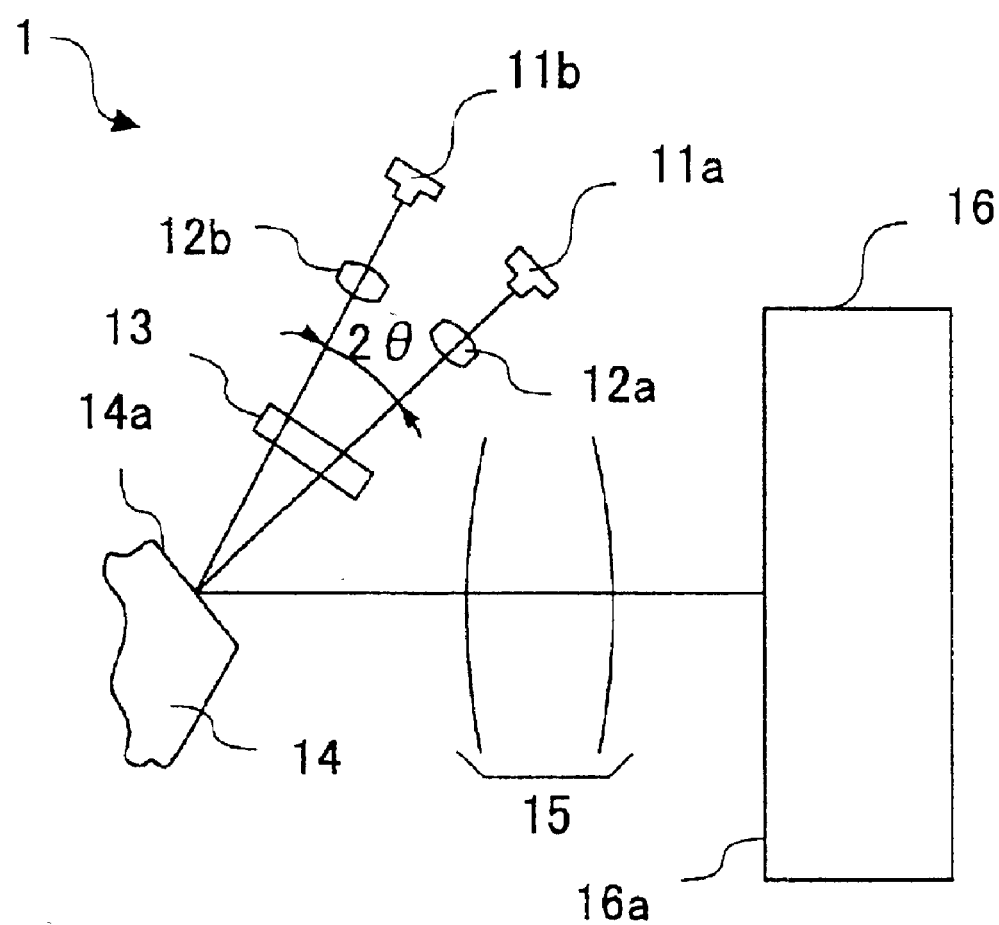
FIG. 1 illustrates a multi-beam scanning device in a first embodiment of the present invention.
Figure 2:
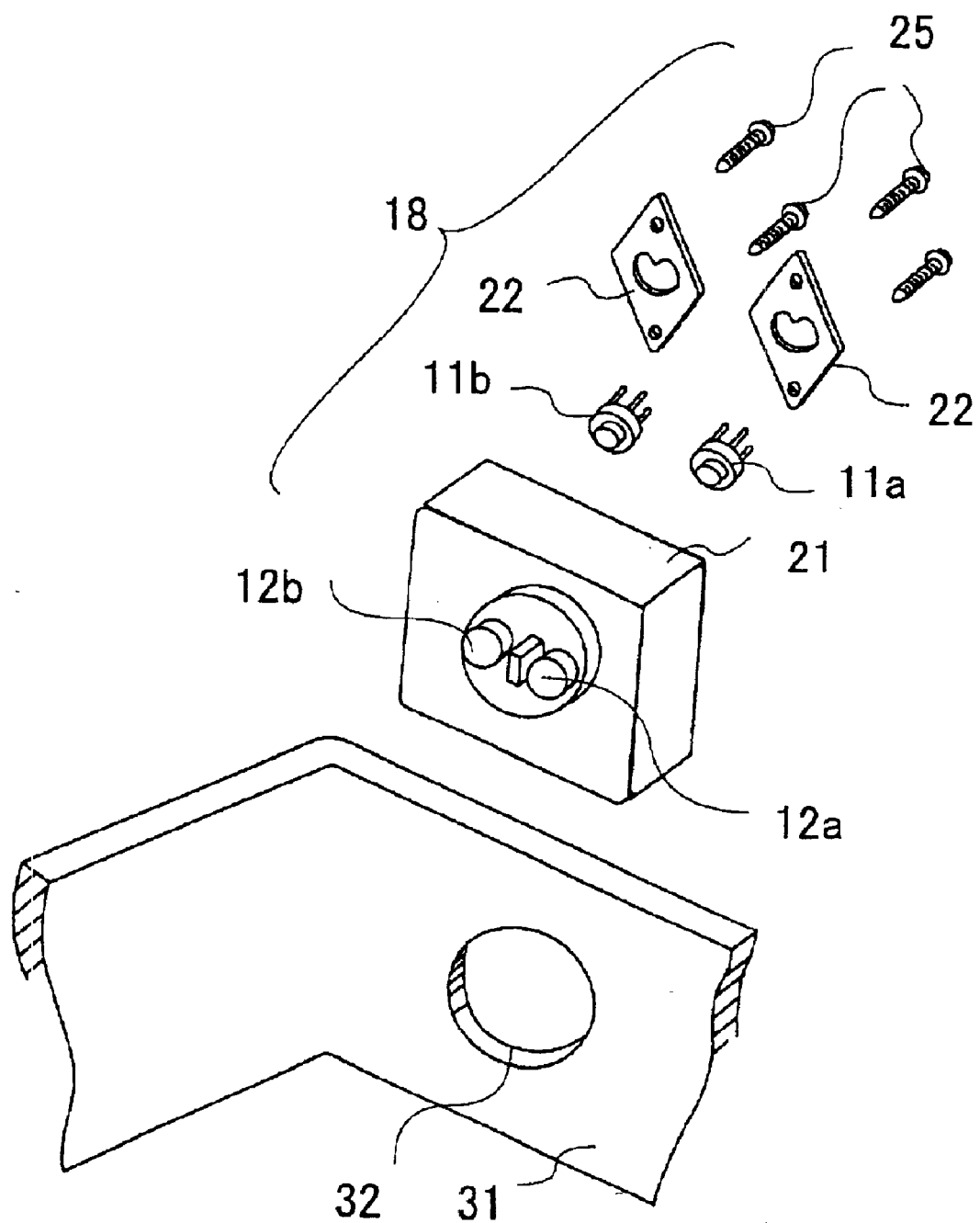
FIG. 2 shows a perspective view of parts/components located in and near a light source unit in the configuration shown in FIG. 1.
Figure 3:
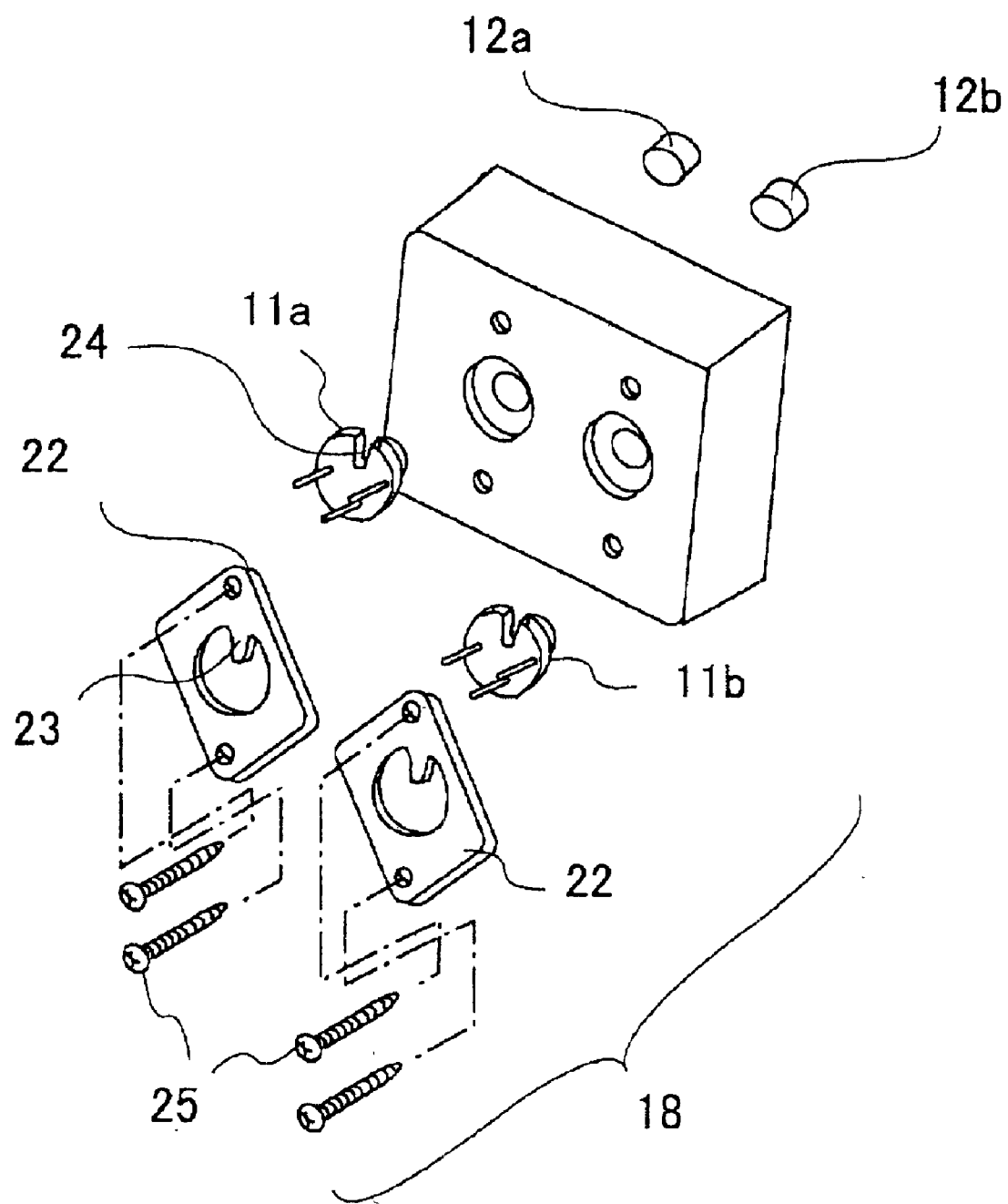
FIG. 3 shows a perspective view of an LD base shown in FIG. 2 viewed from the rear side.

FIG. 1 illustrates a general configuration of a multi-beam scanning device in a first embodiment of the present invention, FIG. 2 shows a perspective view of a part including a light source unit of this device, and FIG. 3 shows a perspective view of FIG. 2 viewed from the reverse side. This multi-beam scanning device 1 is provided in a color laser printer, and has a function of scanning on a surface (to-be-scanned surface) 16a of a photoconductor 16 of the color laser printer with laser beams, thereby, according to a well-known electrostatic photographic scheme, an electrostatic latent image being formed on the photoconductor surface.

As shown in FIG. 1, in the multi-beam scanning device 1, two semiconductor laser arrays (referred to as LD arrays, hereinafter) 11a and 11b each of which includes a plurality of light emitting points 10 (see FIG. 5) disposed like an array with uniform intervals, two coupling lenses 12a and 12b for carrying out coupling of the light emitted from the LD arrays 11a and 11b, respectively, a cylindrical lens 13 for making the laser beams from the coupling lenses 12a and 12b be imaged as long images along the main scanning direction on a deflection reflective surface 14a of a polygon mirror 14, a scanning optical system 15 for making the to-be-scanned surface 16a which is the surface of the photoconductor drum 16 to be scanned at a uniform velocity with beam spots imaged from the laser beams deflected/reflected by the polygon mirror 14, and the polygon mirror 14 for deflecting the laser beams. It is noted that, although FIG. 1 shows the scanning optical system 15 as a simplified symbol, this actually consists of a predetermined combination of lenses and mirrors, as well-known in the art (see FIG. 19, 'scanning optical system 115, as a configuration example).

As shown in FIG. 2, the two LD arrays 11a and 11b are held on a common LD base (holding member) 21, and the corresponding coupling lenses 12a and 12b are fixed at a receptacle part of the LD base 21 after having undergone positional adjustment such as to be suitable to the collimate property of the light beams and the directions of the optical axes thereon according to the characteristics of the subsequent scanning optical system 15. According to the first embodiment, a light source unit 18 includes the LD arrays 11a and 11b, the coupling lenses 12a and 12b, and the LD base 21.

This light source unit 18 is held on an insertion hole 32 provided in an optical housing 31 in a manner such that it can be rotated approximately about the optical axes on the laser beam. By this rotation of the light source unit 18 approximately about the optical axes, thereby, a distance PZ between centers of the beam spots of the respective LD array 11a or 11b (pitch between centers; the sub-scanning directional component of the distance between Ca and Cb shown in FIG. 8) can be adjusted, as will be described later. Moreover, at least one of the LD arrays 11a and 11b is rotatably held on the LD base 21 approximately about the optical axes.

It is noted that, the above-mentioned 'rotation approximately about the optical axes', referred to as a 'γ rotation', means a rotation of the light-source unit (light-source device) about an axis which passes through the central position of the light-emitting points of the LD arrays 11a and 11b, and extends in parallel to the optical axes of these LD arrays.

As shown in FIG. 3, the LD array 11a is fixed to the LD base 21 with screws 25 using a pressing plate 22. In case it is fixed, a cut-out 24 provided in a package of the LD array 11a is engaged with a projection 23 provided in the pressing plate 22, and, then, as a result of the pressing plate 22 being rotated with respect to the base 21, it can be rotationally adjusted. Similarly, the LD array 11b is fixed onto the base 21 with a pressing plate 22 together with screws 25 and can be rotationally adjusted.

By configuring the light source unit 18 as described above, it is possible to correct an beam pitch arrangement error on the light-emitting points on the LD array 11a (or 11b) by rotation of the LD array by itself alone approximately about the optical-axis thereof.

According to the first embodiment, as shown in FIG. 5, the n light-emitting points (n=4, in the example) are disposed with equal intervals in each LD array, and it is called n-ch LD array, and, as will be described now, a beam-spot arrangement made on the to-be-scanned surface 16a made by the 2n light beams emitted from these two LD arrays 11a and 11b is adjusted, as will be described with reference to FIGS. 4 through 14.

As shown in FIG. 1, the laser beams emitted from the LD arrays 11a and 11b are coupled by the corresponding coupling lenses 12a and 12b, respectively, and then, are shaped by apertures (not shown in the figure). These laser beams are imaged to be line images long along the main scanning direction (imaged along the sub-scanning direction) on the deflection reflective surface 14a of the polygon mirror 14 through the cylindrical lens 13. Then, after the deflection and reflection is carried out thereby, they make beam spots on the to-be-scanned surface 16a of the photoconductor drum 16 through the scanning optical system 15, and thereby, scanning on the to-be-scanned surface 16a at a uniform velocity can be achieved.

In this configuration, as variation in reflection point between respective laser beams can be controlled as a result of the optical axes of the laser beams coming from the two semiconductor laser arrays being made to cross near the deflection reflective surface 14a, and, thus, it is possible to effectively control the deviation in the beam characteristics on the to-be-scanned surface.

Figure 4:
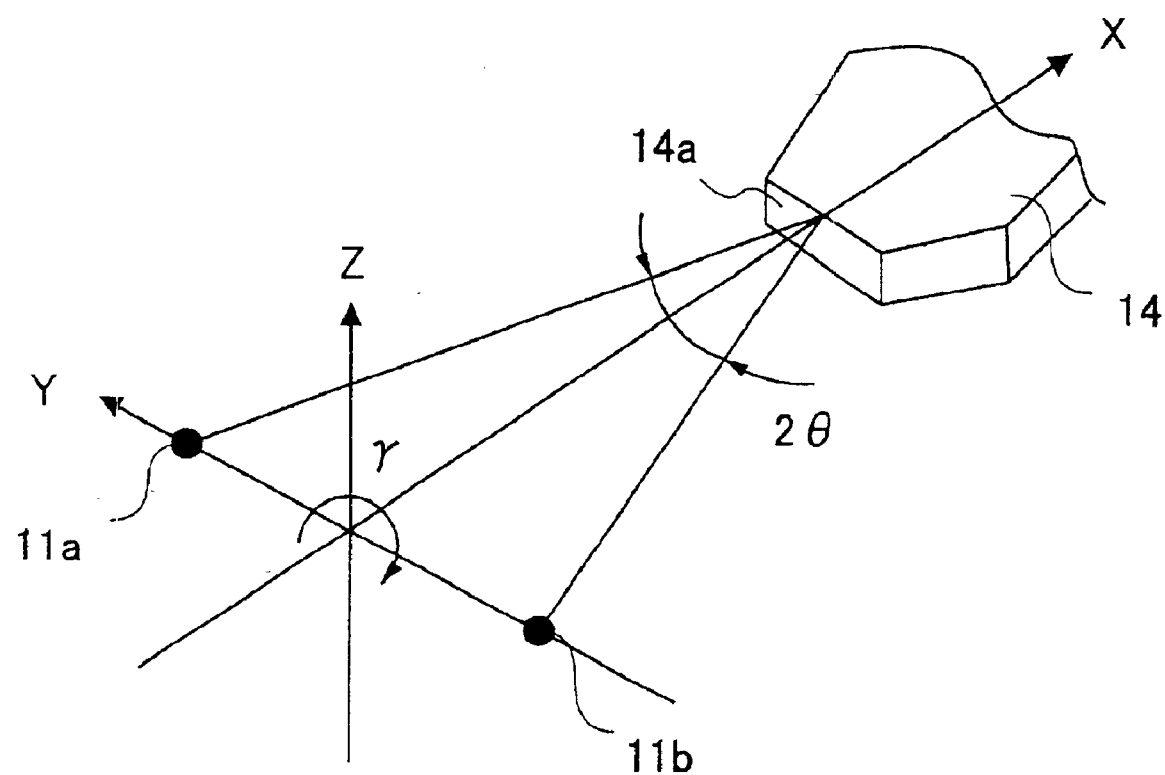
FIG. 4 illustrates a state of crossing of laser beams on a deflection reflective surface of a polygon mirror in the configuration shown in FIG. 1.

As shown in FIG. 4, the two LD arrays 11a and 11b are disposed away from one another along the main scanning direction, the laser beams (namely, the optical axes of the LD arrays 11a and 11b) coupled by the coupling lenses 12a and 12b, respectively, cross mutually near the deflection reflective surface 14a of the polygon mirror 14, and the crossing angle is set as 2θ, as shown in FIG. 4.

Figure 5A:
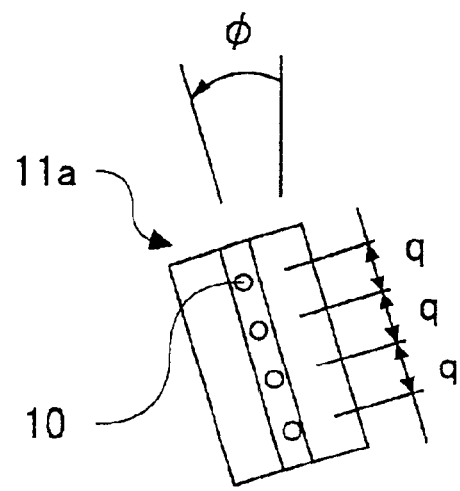
FIGS. 5A and 5B illustrate a state where an LD array is inclined with respect to a sub-scanning direction in the configuration shown in FIG. 1.

Generally, the LD array 11a (having the intervals q between adjacent light emitting points) is disposed to have an inclination angle φ with respect to the sub-scanning direction (vertical direction on the figure) as shown in FIG. 5A. In this case., on the to-be-scanned surface 16a, as shown in FIG. 6, as a result of being magnified by magnification (mY along the main scanning direction and mZ along the sub-scanning direction) of the optical system, the resulting interval of adjacent beam spots is expressed as QY and QZ on the to-be-scanned surface 16a. Moreover, in FIG. 5B, the light-emitting points on the LD array 11a are expressed as r1, r2, . . . , rn, while the beam spots on the to-be-scanned surface 16a corresponding to the above-mentioned light-emitting point are expressed with R1, R2, . . . , Rn in FIG. 6, respectively. There, 'n' shows the number of the light-emitting points on each of the LD arrays 11a and 11b.

Figure 8:
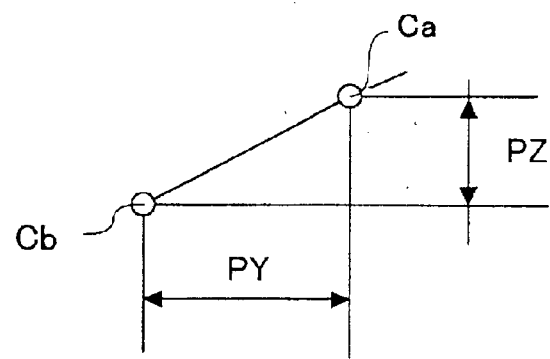

By rotating (rotation angle: γ) the light source unit 18 approximately about the optical axes, as shown in FIG. 8, the sub-scanning direction component PZ of the distance (pitch between adjacent centers) between center positions Ca and Cb of beam spots from the respective LD arrays 11a and 11b on the to-be-scanned surface 16a can be set to be a predetermined value according to the following formula (1). There, in the formula (1), fcol denotes the focal length of the coupling lens 12a (12b), and mZ denotes the imaging magnification along the sub-scanning direction of the entire optical system (multi-beam scanning device).

$$PZ = 2 \times fcol \times \tan\theta \times \sin\gamma \times mZ \tag{1}$$

Figure 9A:
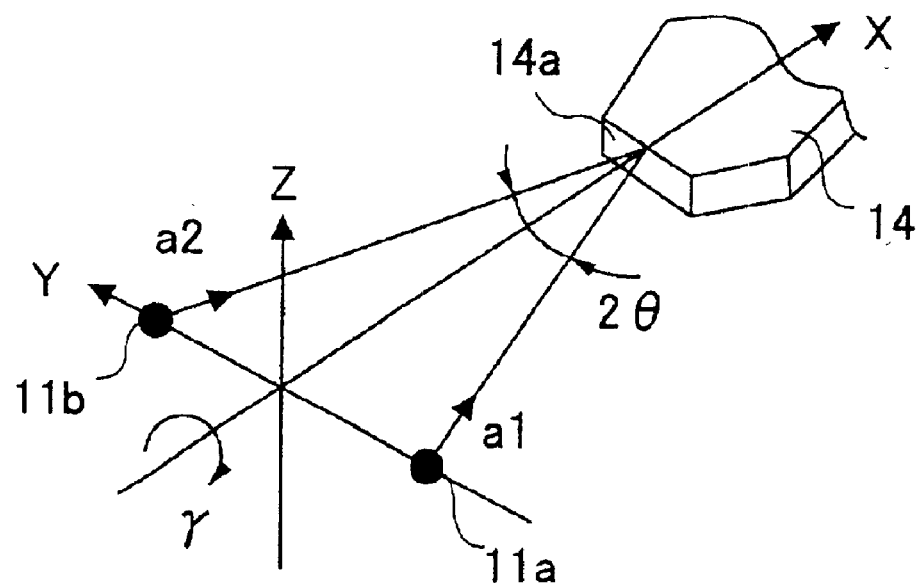
FIGS. 9A, 9B, 9C, 10A, 10B and 10C illustrate how to derive conditional formulas according to the present invention on the configuration shown in FIG. 1.
Figure 9B:
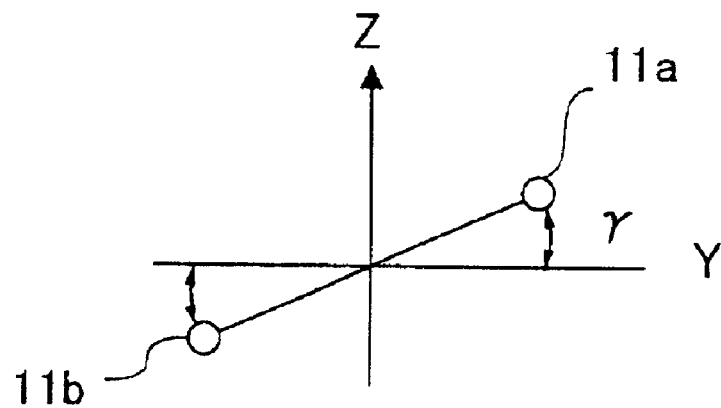
Figure 9C:
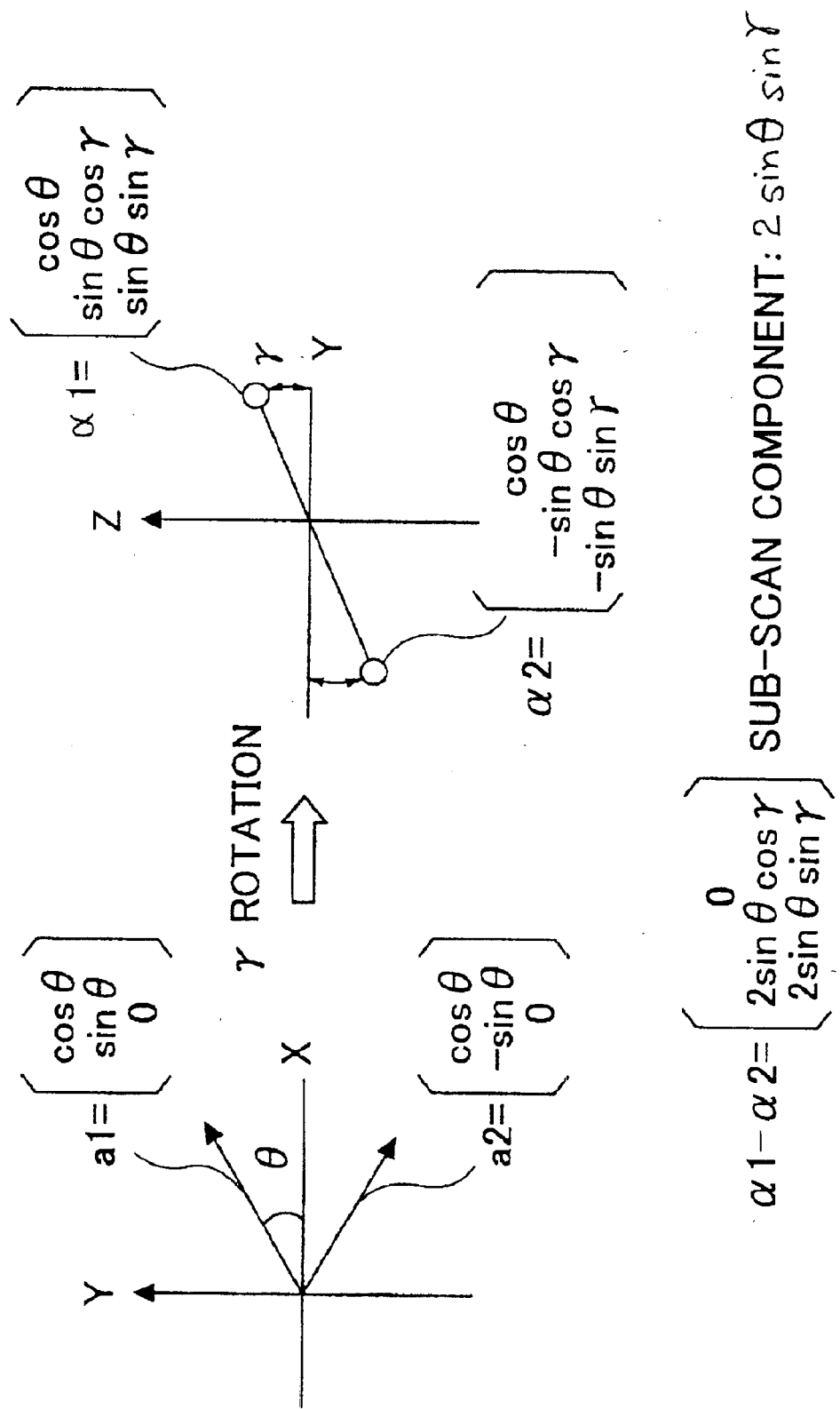
Figure 10A:
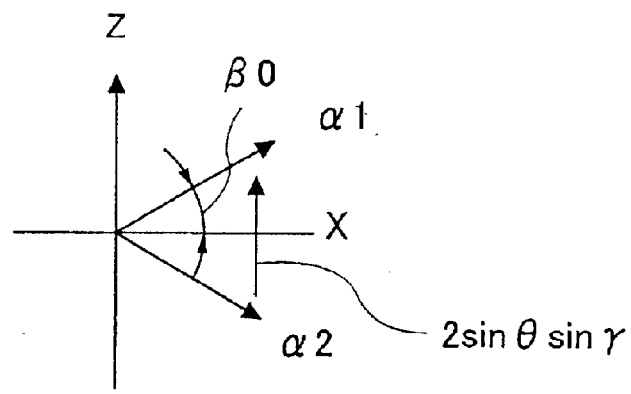

How to derive the above-mentioned formula (1) will now be described with reference to FIGS. 9A–9C and FIGS. 10A–10C. As shown in FIG. 9A, unit vectors of the laser beams coming from the respective LD array 11a and 11b are assumed as a1 and a2 (i.e., directions of the optical axes of the respective LD arrays), respectively, and, also, as shown in FIGS. 9B and 9C, the vectors of the laser beams obtained when the LD arrays 11a and 11b are rotated by an angle γ about the X-axis (γ rotation) is assumed as α1 and α2, respectively. Then, 2 sin θ sine γ is obtained as the sub-scanning component of (α1−α2). Then, as shown in FIG. 10A, the angle β0 which is the angle (sub-scanning direction component) between the laser beams obtained through the γ rotation is expressed as follows:

$$\tan \beta_0 = \sin \theta \sin \gamma / \cos \theta = \tan \theta \sin \gamma$$

Figure 10B:
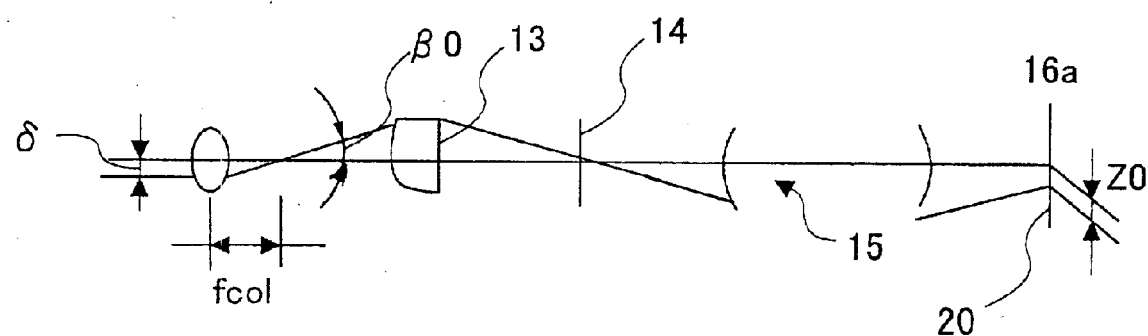

Thereby, as shown in FIG. 10B, the scanning position Z0 on the to-be-scanned surface 16a on the angle β0 between the laser beams is obtained, as follows:

$$Z_0 = fcol \times \tan \theta \times \sin \gamma \times mZ$$

Figure 10C:
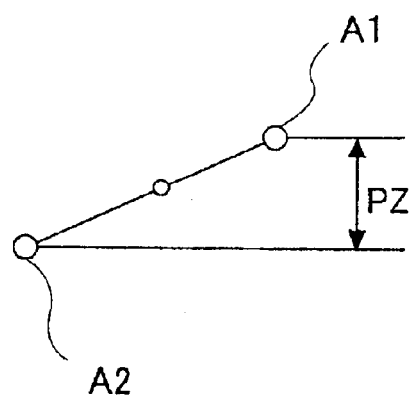

Then as shown in FIG. 10C, the formula (1) for the sub-scanning direction component PZ of the distance between adjacent centers of the LD arrays 11a and 11b (Z direction), i.e., the distance between the center positions Ca and Cb of the beam spots from the respective LD arrays on the to-be-scanned surface 16a (pitch between centers) is obtained.

Figure 11:
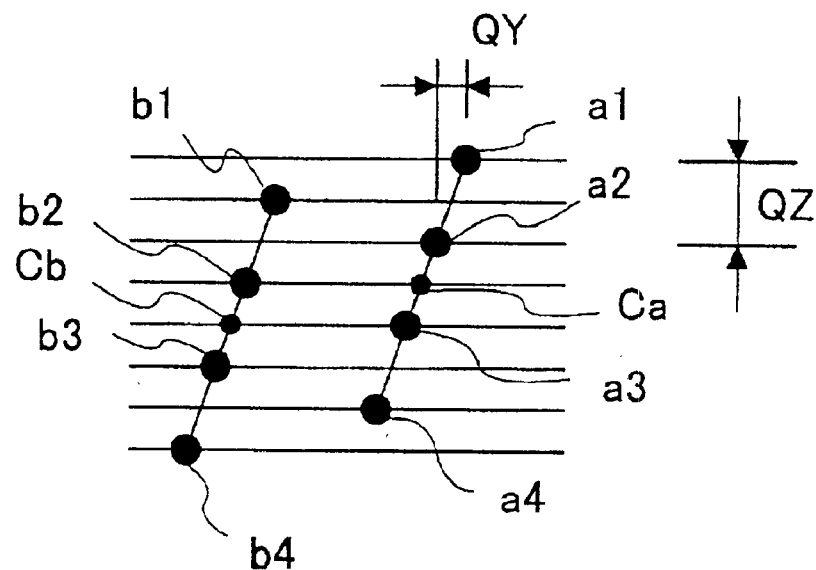
FIGS. 11 and 12 illustrate different examples in adjustment of beam spot arrangement according to the first embodiment of the present invention.
Figure 12:
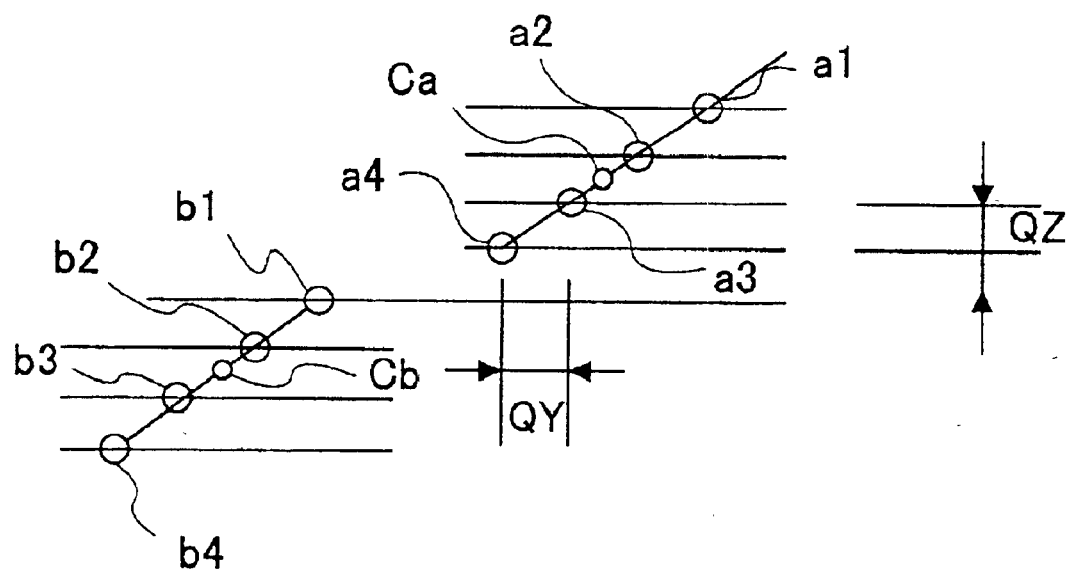

In order to arrange the beam spots on the to-be-scanned surface 16a at equal intervals along the sub-scanning direction, there are two different methods as shown in FIG. 11 and FIG. 12. According to FIG. 11, the light-emitting points of the LD array 11a and 11b are arranged alternately. In this case, the distance between the centers Ca and Cb of the respective LD arrays 11a and 11b corresponds to the distance between adjacent scan lines. According to FIG. 12, the light-emitting points of the LD arrays 11a and 11b are arranged in series. In this case, the distance between the centers Ca and Cb corresponds to the intervals of n scan lines.

Figure 5B:
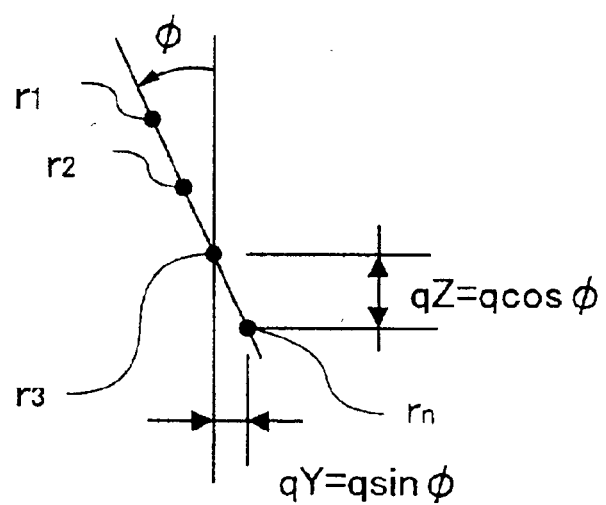
Figure 6:
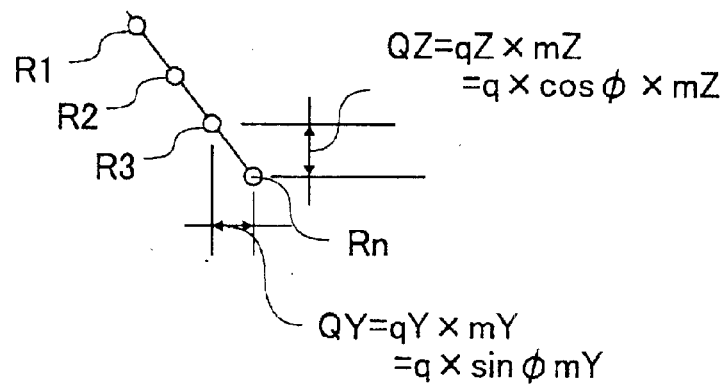
FIGS. 6, 7 and 8 illustrate adjustment of a beam spot arrangement on the to-be-scanned surface in the configuration shown in FIG. 1.
Figure 7:
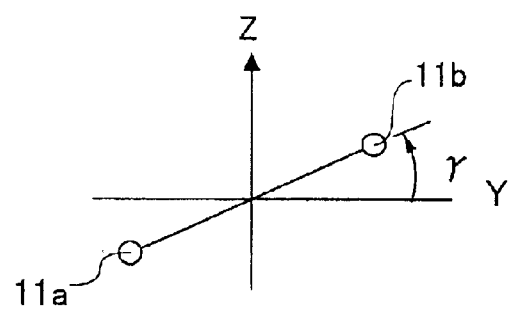

As shown in FIGS. 5A and 5B, in case each LD array is inclined by the angle φ, the arrangement of the beam spots on the to-be-scanned surface 16a along the main and sub-scanning directions, i.e., the interval QY along the main scanning direction and the interval QZ along the sub-scanning direction between adjacent beam spots on the LD array 11a are expressed by the following formulas (4) and (5), respectively. From the following formula (4) and formula (5), the maximum interval on single scan (interval between the beam spots R1 and Rn shown in FIG. 6) is expressed by (n−1)×QY and (n−1)×QZ, respectively.

Main scanning direction:

$$QY = q \times \sin \phi \times mY \quad (4)$$

Sub-scanning direction:

$$QZ = q \times \cos \phi \times mZ \quad (5)$$

Figure 13A:
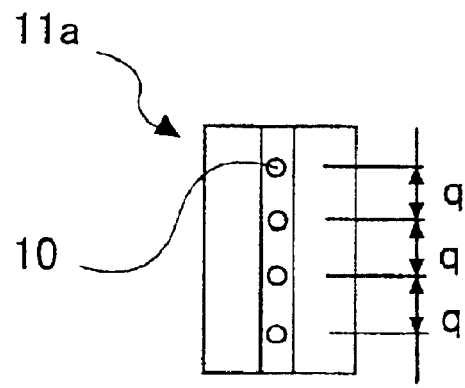
FIGS. 13A, 13B and 14 illustrate how to derive conditional formulas according to the present invention on the configuration shown in FIG. 1.
Figure 13B:
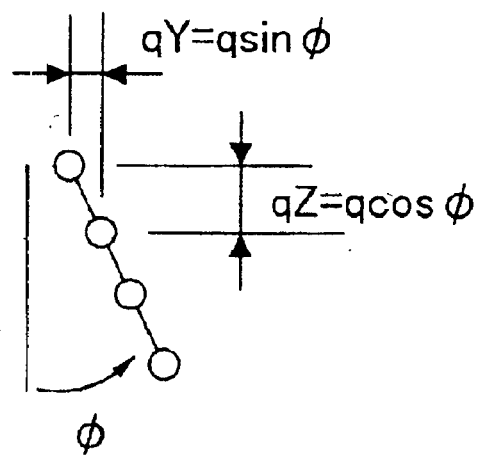
Figure 13B:
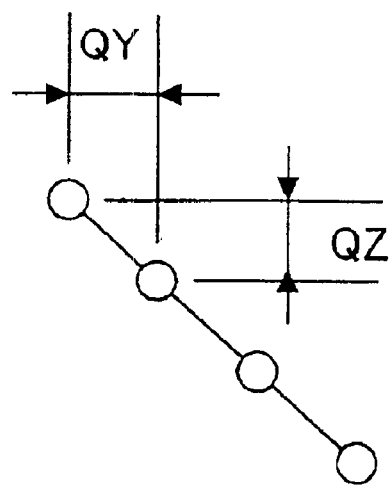

How to derive these formulas (4) and formula (5) will now be described based on FIGS. 13A and 13B. In case the LD array 11a in the state shown in FIG. 13A is inclined by the angle φ as shown in FIG. 13B, the interval between the light-emitting points on the LD array 11a is obtained as qY=q sin φ along the main scanning direction while the interval along the sub-scanning direction is obtained as qZ=q cos φ. Thereby, the formula (4) for the interval QY along the main scanning direction between beam spots on the to-be-scanned surface 16a (image surface) and the formula (5) for the interval QZ along the sub-scanning direction are obtained.

Moreover, an amount of deviation ΔQY on QY along the main scanning direction of the above-mentioned beam spot arrangement when the arrangement angle φ changes by slight amount Δφ, and an amount of deviation ΔQZ on QZ along the sub-scanning direction in the same case are shown by the following formula (6) and the formula (7). There, the amount of deviation ΔQY along the main scanning direction is obtained by differentiating the above-mentioned formula (4) with respect to φ, while the amount of deviation ΔQZ along the sub-scanning direction can be obtained by differentiating the above-mentioned formula (5) with respect to φ.

Main scanning direction:

$$\Delta QY = q \times \cos \phi \times mY \times \Delta \phi \quad (6)$$

Sub-scanning direction:

$$\Delta QZ = -q \times \sin \phi \times mZ \times \Delta \phi \quad (7)$$

Furthermore, an amount of deviation ΔPZ on the sub-scanning direction component PZ of the pitch between centers Ca and Cb is expressed by the following formula (10) from the formula (1).

$$\Delta PZ = 2 \times fcol \times \tan \theta \times \cos \gamma \times mZ \quad (10)$$

Figure 14:
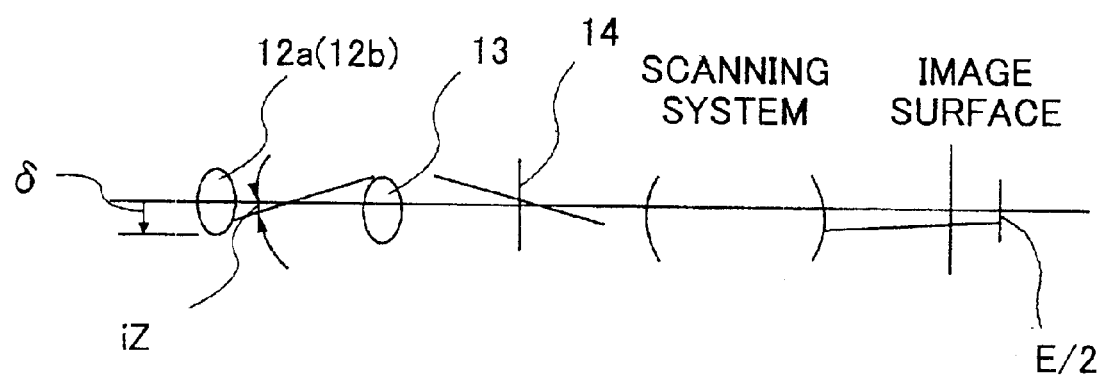

Position adjustment on the coupling lens 12a (12b) corresponding to the LD array 11a (11b) is made such that a desired collimate characteristic and light-emitting direction (optical axis) may be achieved. Generally, such assembly adjustment is called "optical axis/collimate adjustment". It is assumed that optical axis adjustment accuracy (possible angle error along the sub-scanning direction on the laser beam) is iZ (rad). In case the angle errors on the two LD arrays 11a and 11b occur oppositely one another (maximum: 2×iZ), the amount E deviation (adjustment error) on the center positions Ca and Cb of the beam spots on the to-be-scanned surface 16a is obtained, as shown in FIG. 14, by the following formula (2):

$$E = 2 \times fcol \times \tan(iZ) \times mZ \quad (2)$$

The rotation angle γE of the light source unit 18 required to correct this amount E of derivation (maximum possible error) is obtained by the following formula (3) from the formula (1).

$$\sin \gamma E = \tan(iZ) / \tan \theta \quad (3)$$

By rotating the light source unit 18 by the above-mentioned angle γE, the LD arrays 11a and 11b revolve by the angle γE (relative positional change) and also each rotates by the same angle alone. Accordingly, as the change amount on the arrangement angle of the LD array 11a (11b) alone occurring thereby can be expressed by Δφ=γE. Thereby, as the deviation amount E on the center positions is corrected, the amount of change ΔQY along the main scanning direction of the beam spot arrangement and the amount of change ΔQZ along the sub-scanning direction of the same occurring thereby can be expressed by the following formulas (8) and (9) from the formulas (6) and (7):

Main scanning direction:

$$\Delta QY = q \times \cos \phi \times mY \times \gamma E \quad (8)$$

Sub-scanning direction:

$$\Delta QZ = -q \times \sin \phi \times mZ \times \gamma E \quad (9)$$

With reference to FIGS. 15A, 15B, 16A and 16B, previously, a reason why, in an 8 beam scanning device in which laser beams emitted by two semiconductor laser arrays 51a and 51b each of which has four light-emitting points are used, beam spot arrangement on a to-be-scanned surface 56a is difficult, will now be described for a comparison example shown in the figures. A configuration of an optical system of the comparison example shown in the figures is almost the same as that shown in the figures with which how to derive the above-mentioned formulas has been described above. However, as shown FIG. 15B, a light source unit 58 is used there in which beams are combined by using a beam combining prism 57. Further, coupling lenses 52a and 52b, a cylindrical lens 53, and a scanning optical system 55 are provided there.

Figure 15A:
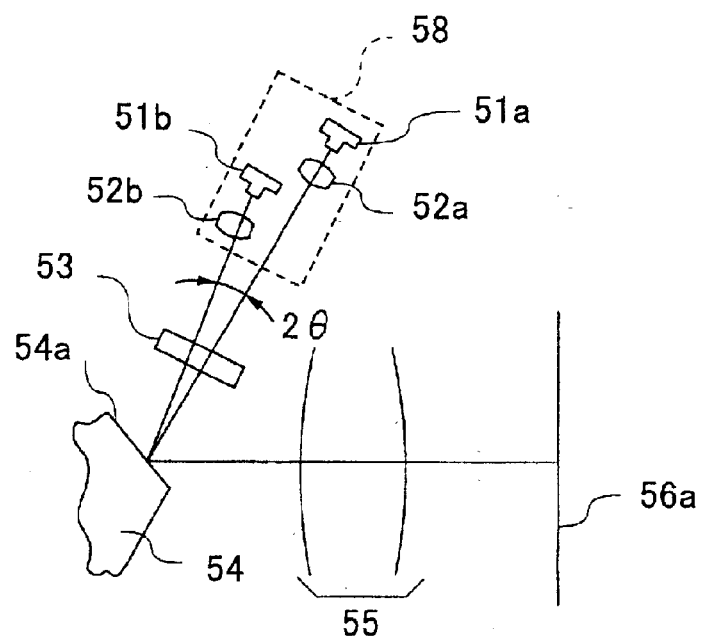
FIGS. 15A and 15B illustrate a configuration of a comparison example for the first embodiment of the present invention.
Figure 15B:
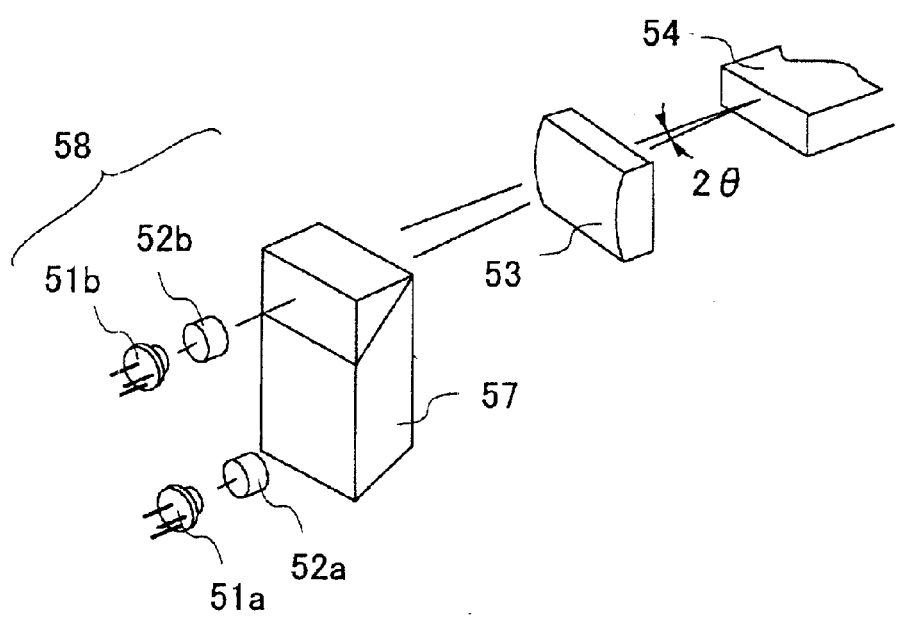

As shown in FIG. 15B, in the light source unit 58, the LD arrays 51a and 51b are located away from one another along the sub-scanning direction, and laser beams emitted therefrom are combined by the beam combining prism 57 which combines laser beam through a polarization characteristic thereof.

The combined laser beams (namely, optical axes of the two LD arrays) cross mutually near the deflection reflective surface of a polygon mirror 54, and the crossing angle is set as $2\theta$, as shown in the figure. There, in FIG. 15A, the light path on laser beam emitted from the LD array 51a and bent by the beam combining prism 57 is shown in an expanded manner.

Figure 16A:
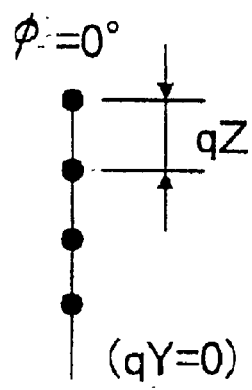
FIGS. 16A and 16B illustrate an arrangement on an LD array and an arrangement on a to-be-scanned surface in the configuration shown in FIGS. 15A and 15B.
Figure 16B:
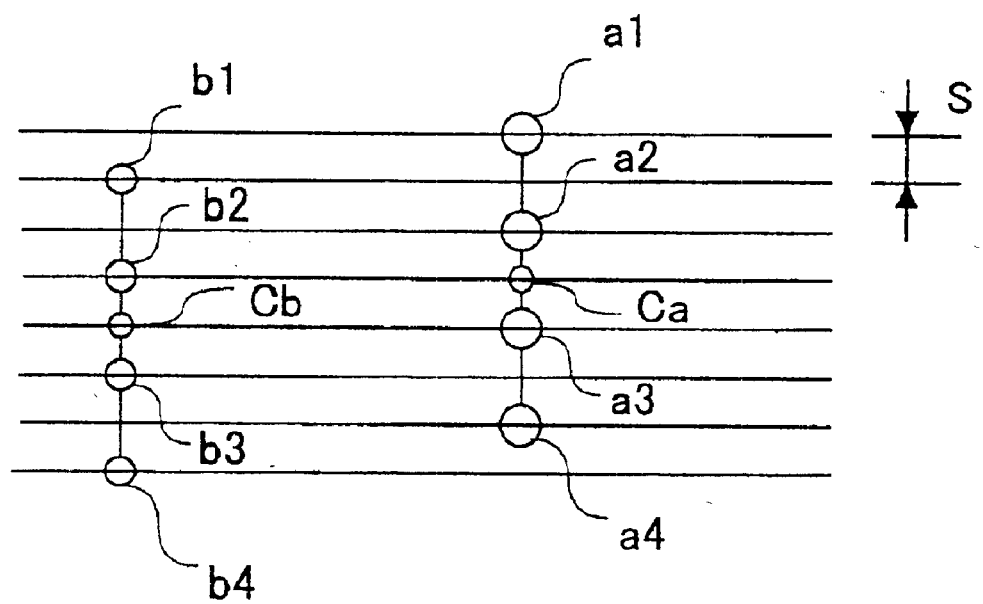

The specification of the optical system (writing density: 1200 dpi along the sub-scanning direction) of this comparison-example is as follows:

The interval between adjacent light-emitting points on the LD array 51a (51b): q=14 μm;

The number of light-emitting points on the LD array 51a (51b): n=4;

The arrangement angel of the LD array 51a (51b): $\phi=0°$;

The focal length of the coupling lens 52a (52b): fcol=15 (mm);

Half the crossing angle at which the laser beams emitted from the LD arrays 51a and 51b cross near the deflection reflective surface 54a: $\theta=0.25°$;

The optical axis adjustment accuracy (possible angular error): iZ=0.6 (mrad);

The imaging magnification on the main scanning direction: mY=10 (times);

The imaging magnification on the sub-scanning direction: mZ=3 (times);

The arrangement of light-emitting points at the end of light source (LD arrays 51a and 51b) is shown n FIG. 16A, while the beam spot arrangement on the to-be-scanned surface 56a corresponding thereto is shown in FIG. 16B. In the above-mentioned configuration, the interval QZ along the sub-scanning direction of the beam spots on the LD array 51a (51b) is calculated as 42 μm from the formula (5), and then, the interval of 21 μm (namely, 1200 dpi) can be achieved by arranging alternately the beam spots corresponding to the LD arrays 51a and 51b, as shown in FIG. 16B. There, each scanning-line pitch S which is the interval along the sub-scanning direction of the center positions Ca and Cb of the beam spots between the LD arrays 51a and 51b (pitch between centers; Ca–Cb) is also 21 μm, and this can be achieved by shifting the positional relationship between the two LD arrays 51a and 51b and the coupling lenses 52a and 52b by 3.5 μm each oppositely along the sub-scanning direction.

Then, when the optical axis derivation iZ=0.6 (mrad) along the sub-scanning direction occurs due to the positioning accuracy error of LD array 51a (51b) and coupling lens 52a (52b), the pitch Ca–Cb between centers deviates by E=0.054 mm=54 μm, according to the formula (2). In order to correct this, it is necessary to rotate $\gamma E=0.1375$ (rad)=7.9° the whole light source unit 58, according to the formula (3).

By this rotation, change of $\Delta QY=19.3$ μm on the interval of adjacent beam spots on each LD array 51a (51b) occurs according to the formula (8) as a result of the thus-occurring angle $\gamma E$ rotation of the LD array 51a (51b) alone occurring thereby.

Thereby, between scans (between the scans of subsequent deflection reflection operations), (n–1) times $\Delta QY$, i.e., $19.3\times(4-1)=57.9$ μm of beam spot arrangement error occurs, and thus, as this value is large, there is a possibility of causing quality degradation on a resulting image by an image formation apparatus employing this scanning device.

As to the sub-scanning direction, since $\Delta QZ=0$ according to the formula (9) in the case of $\phi=0°$, then, the formula (5) is applied, and, thus, $$\Delta QZ = q\times(\cos(\phi+\Delta\phi)-\cos\phi)\times mZ = -0.4 \text{ μm since } \Delta\phi=\gamma E=7.9°$$

Therefore, the amount of change of the beam spot interval on both ends of each LD array is 1.2 μm, and is sufficiently small. Thus, no problem occurs concerning the sub-scanning direction.

Thus, according to the above-mentioned comparison example, when the possible positioning error (optical axis deviation along sub-scanning direction) occurs on the LD arrays and coupling lenses, it is difficult to satisfactorily adjust the beam spot arrangement on the to-be-scanned surface 56a. This is because, in order to correct the pitch between centers Ca and Cb (sub-scanning direction) occurring in correcting the above-mentioned positional error, the light source unit 56 should be rotated approximately about the optical axes, and, thereby, the arrangement angle of LD array 51a (51b) necessarily changes. Accordingly, in order to solve this problem, it is necessary to make small as possible the influence on the beam spot arrangement on the to-be-scanned surface, even when the arrangement angle of the LD arrays changes as a result of rotation of the light source unit approximately about the optical axes ($\gamma$ rotation).

Formulas needed for proving the advantage of the above-mentioned first embodiment of the present invention in comparison to the above-mentioned comparison example will now be described. In the scanning optical system of the above-mentioned comparison example, change in the beam pitch between adjacent light-emitting points of each LD array is expressed by the following formula (11) from the formula (6), and change (along the sub-scanning direction) in the pitch between centers Ca and Cb is expressed by the following formula (12) from the formula (10):

$$\Delta QY/\Delta\gamma = q\times\cos\phi\times mY \quad (11)$$

$$\Delta PZ/\Delta\gamma = 2\times fcol\times\tan\theta\times\cos\gamma\times mZ \quad (12)$$

When the value of the formula (11) is fully small as compared with the value of the formula (12), the influence of rotation ($\Delta\gamma$) of the light source unit 18 exerted on $\Delta QZ$ can also be made sufficiently small. The formula (11) is a formula concerning the arrangement between adjacent beam spots. With regard to the beam spot arrangement (relation between R1 and Rn in FIG. 6) between the light-emitting points at both ends on each LD array 11a (11b), a formula is obtained as a result of the formula (11) being multiplied by (n–1). Accordingly, the absolute value AY of the ratio of formula (11)×(n–1) and the formula (12) is given by the following formula (13):

$$AY = |(\Delta QY/\Delta\gamma)\times(n-1)/(\Delta PZ/\Delta\gamma)| = |(q\times\cos\phi\times mY)\times(n-1)/(2\times fcol\times\tan\theta\times\cos\gamma\times mZ)| \quad (13)$$

According to the first embodiment of the present invention, q=14 μm (light-emitting point interval on each LD array 11a (11b)); n=4 (the number of light-emitting points on each LD array 11a (11b)), φ=60° (arrangement angle of LD array 11a (11b); fcol=15 mm (focal length of coupling lens 12a (12b)); θ=1.5° (half the crossing angle of the laser beams emitted from the LD arrays 11a and 11b near the deflection reflective surface 14a; mY=10 times (imaging magnification on the main scanning direction); mZ=3 times (imaging magnification on the sub-scanning direction).

In the multi-beam scanning device 1 (writing density: 1200 dpi along the sub-scanning direction) in the first embodiment, the beam spot arrangement on the to-be-scanned surface 16a is such as that shown in FIG. 12, for example. Then, the pitch between centers along the sub-scanning direction should be set as $$n \times (\text{scan-line interval}) = 4 \times 21 = 84 \ (\mu m)$$

Further, the relative positional shift (along the sub-scanning direction) between the two LD arrays 11a and 11b and the coupling lenses 12a and 12b should be set as 14 μm in the mutual opposite direction. Then, it is assumed that the positional accuracy error between the LD arrays 11a and 11b and the coupling lenses 12a and 12b causes the optical-axis shift along the sub-scanning direction of $$iZ = 0.6 \ (\text{mrad})$$

In this case, same as in the above-described case of comparison example, from the formula (2), the amount of change of E=0.054 (mm) occurs in the pitch between centers Ca and Cb along the sub-scanning direction, the rotation angle γE of the light source unit 18 needed for correcting this change is as follows:

$$\gamma E = 0.023 \ (\text{rad}) = 1.3°$$

from the formula (3). Then, from the formula (8), the amount of change ΔQY in the adjacent beam spot interval occurring due to the rotation of γE on the light source unit 18 can be controlled as being ΔQY=1.6 μm, and thus, the amount of deviation in the beam spot interval between the light-emitting points at both ends can be controlled as being 4.8 μm.

When the absolute value (AY, see the formula (13)) of the ratio of "the main scanning direction component: ΔQY×(n−1)/Δγ of the change in the beam spot interval between the light-emitting points at both ends in the same LD array 11a (11b)" and "the sub-scanning direction component: ΔPZ/Δγ of the change in the center positions of the beam spots between the two different LD arrays 11a and 11b" occurring when rotating the light source unit 18 approximately about the optical axes may preferably be limited as shown in the following formula (14), for example, i.e., the coefficient C1 is made not more than 1/10, it is possible to correct the center-to-center deviation E caused by the optical-axis adjustment error easily (by the sensitivity of 1/10).

$$AY \leq C1, \ C1=0.1 \tag{14}$$

For example, deviation occurring in the center-to-center distance up to 100 μm can be corrected in case the permissible value of the amount of change in beam spot arrangement along the main scanning direction is set as 10 μm (≈21 (μm)/2), i.e., ½ dot in writing density of 1200 dpi, determined according to an image output experiment result. In other words, even when such a correction is made on the center-to-center distance ΔPZ, the change ΔQY in the main-scanning-direction beam spot arrangement can be controlled to be within the above-mentioned permissible value.

According to the first embodiment of the present invention, AY=0.09 and thus, the requirement of formula (14) is satisfied. However, the adjustment becomes easier as the coefficient C1 on the formula (14) can be smaller. Accordingly, more preferably, C1=0.02, for example. In the above-mentioned comparison example, AY=1.07>0.1, the requirement of formula (14) is not satisfied, and, thus, a problem may occur.

The same study as in the case of the main scanning direction mentioned above will now be made on the sub-scanning direction. Namely, the absolute value AZ of the ratio of "the sub-scanning direction component: ΔQZ×(n−1)/Δγ of the change in the beam spot interval between the light-emitting points at both ends in the same LD array 11a (11b)" and "the sub-scanning direction component: ΔPZ/Δγ of the amount of change in the center positions of the beam spots between the two, different LD arrays 11a and 11b" occurring when rotating the light source unit 18 approximately about the optical axes is expressed by the following formula (15) from the formula (7) and formula (10):

$$AZ=|(\Delta QZ/\Delta\gamma)\times(n-1)/(\Delta PZ/\Delta\gamma)|=|(q\times\sin\phi\times(n-1))/(2\times fcol\times\tan\theta\times\cos\gamma)| \tag{15}$$

By controlling this absolute value AZ by configuring the scanning device 1 such that the coefficient C2 included in the following formula (16) be not more than 1/10, the center-to-center deviation E (along the sub-scanning direction) caused by the optical axis adjustment error can be easily corrected.

$$AZ > C2, \ C2=0.1 \tag{16}$$

According to the first embodiment, AZ=0.05 and thus, the above-mentioned requirement is satisfied. However, the adjustment can be made more easily as the coefficient C2 is smaller. Accordingly, for example, it is more preferable that C2=0.02, for example. In the above-mentioned comparison example, AZ=0, the above-mentioned requirement is satisfied.

Therefore, the sub-scanning direction component ΔQZ of the amount of change in the beam spot interval in each LD array 11a (11b) becomes $$\Delta QZ = AZ \times E = 0.05 \times 54 = 2.5 \ \mu m$$

occurring in correcting the center-to-center deviation E=54 μm caused by the optical axis deviation iZ=0.6 (mrad). As this value is sufficiently small, the influence on an output image by the image formation apparatus using this scanning device can be controlled to be sufficiently small, and can prevent generation of an unusual/degraded image.

The following formula (17) is derived from the formula (7):

$$\Delta QZ/\Delta\gamma = -q \times \sin\phi \times mZ \tag{17}$$

The absolute value of the ratio of the value of this formula (17) and the value of the formula (11) is expressed by A0, by the following formula (18):

$$A0=|(\Delta QY/\Delta\gamma)/(\Delta QZ/\Delta\gamma)|=|(mY/mZ)\times\tan\phi| \tag{18}$$

This formula (18) expresses the ratio of the main scanning direction component and the sub-scanning direction component of the beam spot arrangement change occurring when the rotation γ approximately about the optical axes of the light source unit 18 is made, i.e., change of the arrangement angle φ of the LD arrays 11a and 11b. The allowable range of the absolute value A0 of this ratio is shown in the following formula (19):

$$1/3 \leq A0 \leq 3 \tag{19}$$

By making the range of an absolute value A0 into the range according to the formula (19), the main scanning direction component and sub-scanning direction component of the change in the beam spot arrangement can be made to have an appropriate balance. As for this formula (18), in the case of the above-mentioned comparison example, A0=0, while A0=1.7 in the first embodiment according to the present invention. Accordingly, according to the first embodiment of the present invention, the main scanning direction component and the sub-scanning direction component of the change in beam spot arrangement have an appropriate balance therebetween in comparison with the comparison example.

A second embodiment of the present invention will now be described. However, for the same parts/components as those of the above-mentioned first embodiment, the same reference numerals are given, and duplicated description is omitted.

Figure 17:
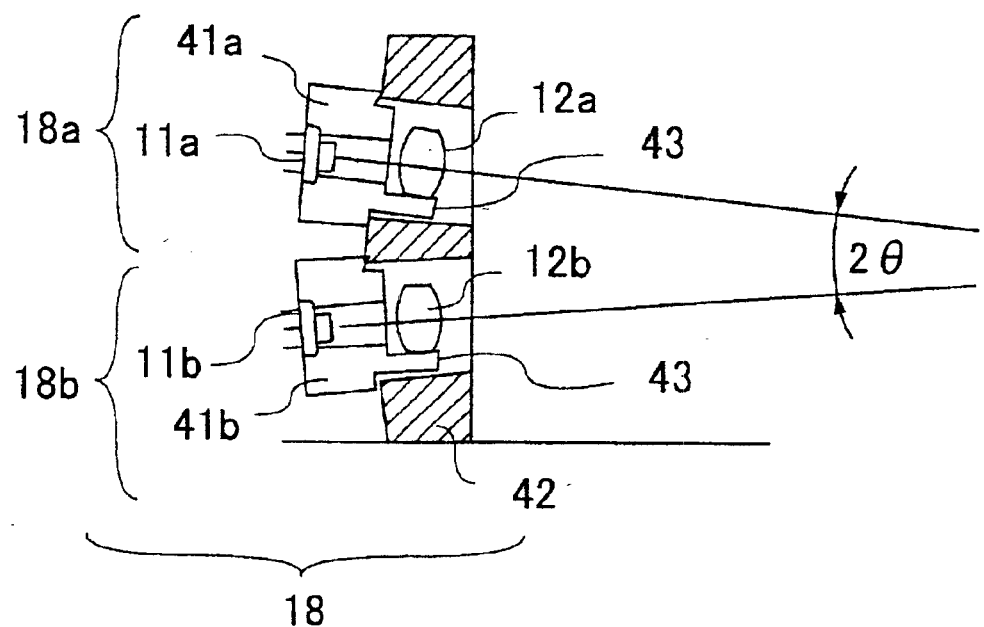
FIGS. 17 and 18 illustrate a light-source unit according to a second embodiment of the present invention (FIG. 17 shows a main scanning section while FIG. 18 shows a sub-scanning section)
Figure 18:
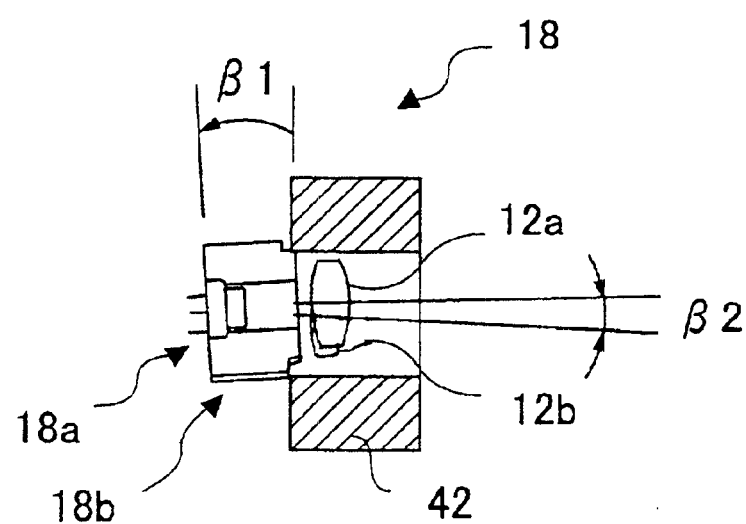

FIG. 17 is a sectional view taken along the main scanning direction of a light source unit in the second embodiment of the present invention, and FIG. 18 is a sectional view taken along the sub-scanning direction of the same light source. The configuration according to the second embodiment for illustrating an aspect of the present invention will now be descried with reference to FIGS. 17 and 18. As shown in FIG. 17, the light source unit 18 has a first light source part 18a and a second light source part 18b.

In the first light source part 18a, the LD array 11a is fixed onto an LD base 41a, a coupling lens 12a is adhered thereonto with adjustment, and, thus, adjustment is made on the collimate characteristics and optical axis directions of laser beams emitted from the LD array 11a according to the characteristics of subsequent scanning optical system. Similarly, on the second light source part 18b, appropriate adjustment is performed. The first light source part 18a and second light source part 18b are rotatably held onto a common flange 42, respectively. This light source unit 18 is rotatably held by an optical housing 31 at an insertion hole 32 (see FIG. 2) thereof.

By creating such a configuration, it becomes possible like in the above-mentioned first embodiment to correct a beam pitch arrangement error in the LD array 11a (11b) by rotation thereof approximately about the optical axes of the LD array 11a (11b). However, according to the second embodiment, what is necessary is merely to rotate each of the first light source part 18a and second light source part 18b independently approximately about the optical axis thereof. Moreover, according to the second embodiment, onto the common LD base 41a (41b), each LD array 11a (11b) and respective coupling lens 12a (12b) which make a pair are fixed. Accordingly, when LD base 41a (41b) is rotated, there is no possibility of changing the relative positional relationship between LD array 11a (11b) and coupling lens 12a (12b).

Moreover, according to the second embodiment, as shown in FIG. 18, at least one of the first and second light source part 18a and 18b can be adjusted in inclination thereof along the sub-scanning direction with respect to the flange 42. By thus enabling the inclination adjustment along the sub-scanning direction, the center-to-center distance in beam spots between the respective LD array 11a and 11b can be adjusted, without rotating the light source unit 18 itself approximately about the optical axes.

For example, when E=54 µm in center-to-center deviation resulting from optical-axis deviation of iZ=0.6 (mrad) is corrected in the above-mentioned comparison example described with reference to FIG. 15 and FIG. 16, γ=7.9° of rotation of the light source unit 56 should be made around the optical axes, and, thereby, the beam pitch arrangement error (57.9 µm) occurs on each LD array 11a (11b).

In contrast thereto, according to the second embodiment, for correcting E=54 µm of center-to-center deviation resulting from optical axis deviation of iZ=0.6 (mrad), for example, the first light source part 18a should be inclined along the sub-scanning direction (in the sub-scanning section) by β1=4.1', according to the formula (2), i.e., E=fcol×tan β1×mZ. In this case (second embodiment), no rotation of the LD array 11a (11b) alone around the optical axis occurs, and, thus, there is no possibility of change in the beam spot arrangement in each LD array 11a (11b). In fact, as shown in FIG. 18, at least one of the LD arrays 11a and 11b can be inclined along the sub-scanning direction alone, as mentioned above, according to the second embodiment.

Thus, according to the second embodiment, in correction of the beam spot arrangement error caused by the optical axis deviation, there is no necessity of rotating the LD array 11a (11b) with respect to the LD base 41a (41b), and, thus, the LD arrays 11a and 11b can be fixed into the LD base 41a (41b) by press-fit manner or the like. Thus, it is possible to effectively reduce the assembly costs.

As described with reference to the above-mentioned first embodiment, a scanning line interval can be adjusted in the multi-beam scanning device which uses laser beams emitted from the plurality of semiconductor lasers, and scans the to-be-scanned surface. In such a configuration, also scanning density switching on the to-be-scanned surface is possible accordingly as will be described later. However, as described above, there is a possibility that a positional deviation along the main scanning direction of the beam spot sequence on each semiconductor laser array occurs on the to-be-scanned surface.

In other words, the semiconductor laser itself also rotates with revolution of light source unit (revolution of the semiconductor laser arrays integrally) in the case of the type in which change of the scanning density is made by rotating the light source unit as a whole approximately about the optical axes thereof. Thereby, a positional deviation along the main scanning direction of the beam spot arrangement on each semiconductor laser array occurs accordingly. Thereby, there is a possibility that this positional deviation along the main scanning direction may bring about quality degradation in the output image from the image output apparatus.

Instead, in an image formation apparatus disclosed by Japanese laid-open patent application No. 2000-255097, an adjustment member is provided which can adjust an imaging position (sub-scanning direction) on a light path between a semiconductor laser array and a beam combining part, equipped with a light source unit which combines laser beams emitted from a plurality of semiconductor laser arrays. In this configuration, a special mechanism by which the adjustment member is driven is needed and thus, there is a possibility of causing enlargement of the apparatus, the cost may rise, and also, the reliability may be lowered.

According to another aspect of the present invention, these problem are directed to be solved in connection with a case where the scan line density is easily switched in a multi-beam scanning device.

A third embodiment of the present invention devised for this purpose will now be described.

As the third embodiment, a 2n beam scanning device employing laser beams from two semiconductor laser arrays (LD arrays) each of which has n light-emitting points located in a line so as to form a shape of an array with equal intervals (q) will now be described for a case n=4, as in the above-mentioned first embodiment.

In the description below, 111a, 111b denote semiconductor laser arrays (LD array); 112a, 112b denote coupling lenses; 113 denotes cylindrical lens, 114 denotes a polygon mirror; 115 denotes a scanning optical system; 116 denotes a photoconductor drum (providing a to-be-scanned surface); 117 denotes a beam combining prism; 118 denotes a light source device (light-source unit); 119 denotes a part of detecting synchronization signals; a1 through a4 denote beam spots from the LD array 111a formed on the to-be-scanned surface 116; b1 through b4 denotes beam spots from the LD array 111b formed on the to-be-scanned surface; Ca and Cb denote the center positions of the beam spots from the LD arrays 111a and 111b, respectively; QY, QZ denote the interval between beam spots on the same LD array on the to-be-scanned surface 116; PY, PZ denote the interval (center-to-center pitch) between the center positions Ca and Cb; and subscripts Y, Z denote the main and sub-scanning directions, respectively.

Moreover, q denotes light-emitting point interval on the LD array; n denotes the number of light-emitting points on each LD array; $\phi$ denotes arrangement (inclination) angle from the sub-scanning direction; fcol denotes the focal length of each coupling lens; $\theta$ denotes half the angle at which the laser beams emitted from the two LD arrays cross near a deflection reflective surface of the polygon mirror between these LD arrays; $\Delta\phi$, $\gamma$ denote rotation angle approximately about the optical axes.

Figure 19:
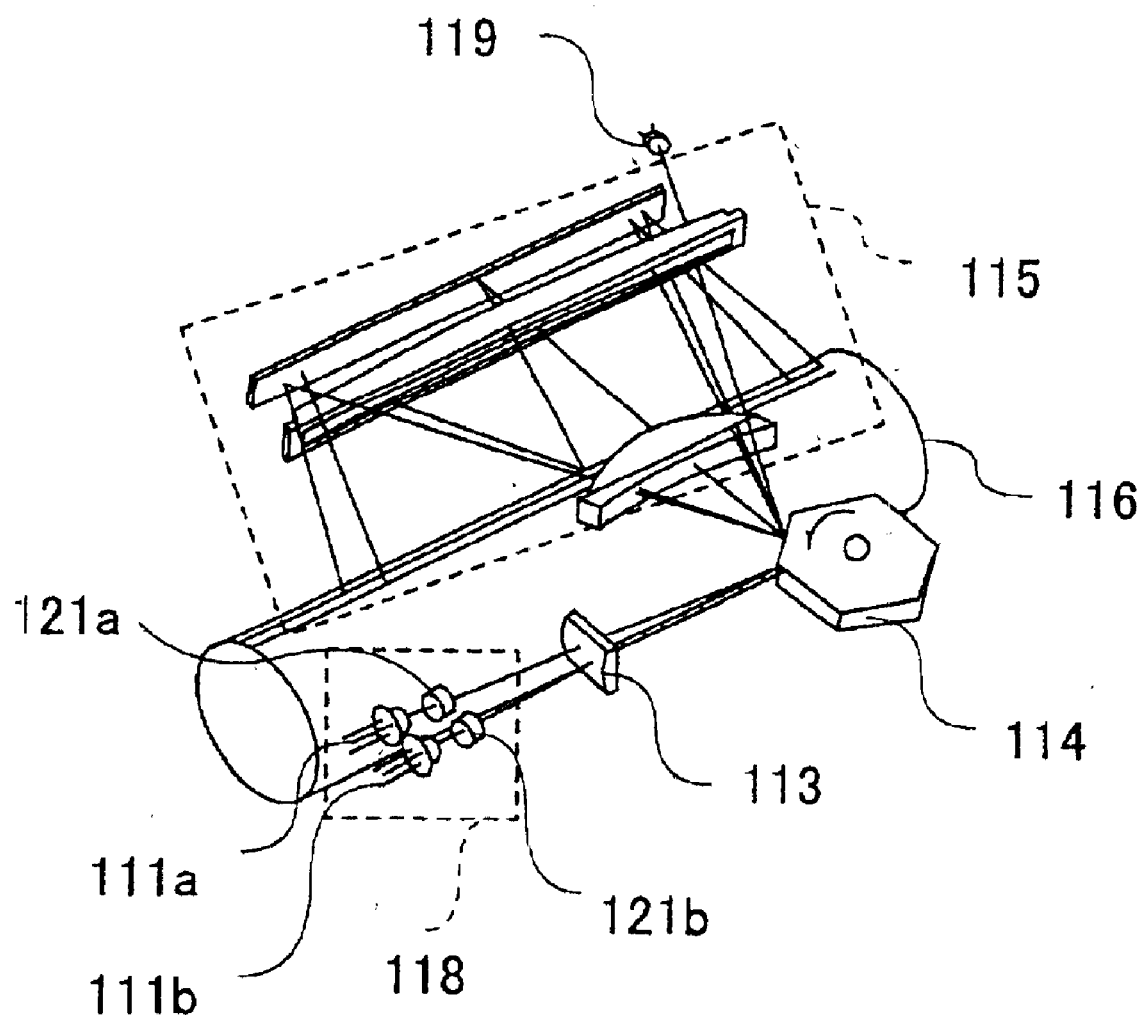
FIG. 19 shows a conceptual perspective view of a multi-beam scanning device according to a third embodiment of the present invention.

In FIG. 19, laser beams emitted from the first LD array 111a and second LD array 111b are coupled by the corresponding coupling lenses 112a and 112b, respectively, and are shaped by apertures not shown. These parts, i.e., the above-mentioned LD arrays 111a and 111b, the coupling lenses 112a and 112b, and a holding member holding them are called a light source device 118. Positional adjustment (positional relationship adjustment) of the LD arrays 111a and 111b and the coupling lenses 112a and 112b is performed so that desired collimate characteristics and desired light-emitting ejection direction (optical-axis direction) may be provided.

Figure 20A:
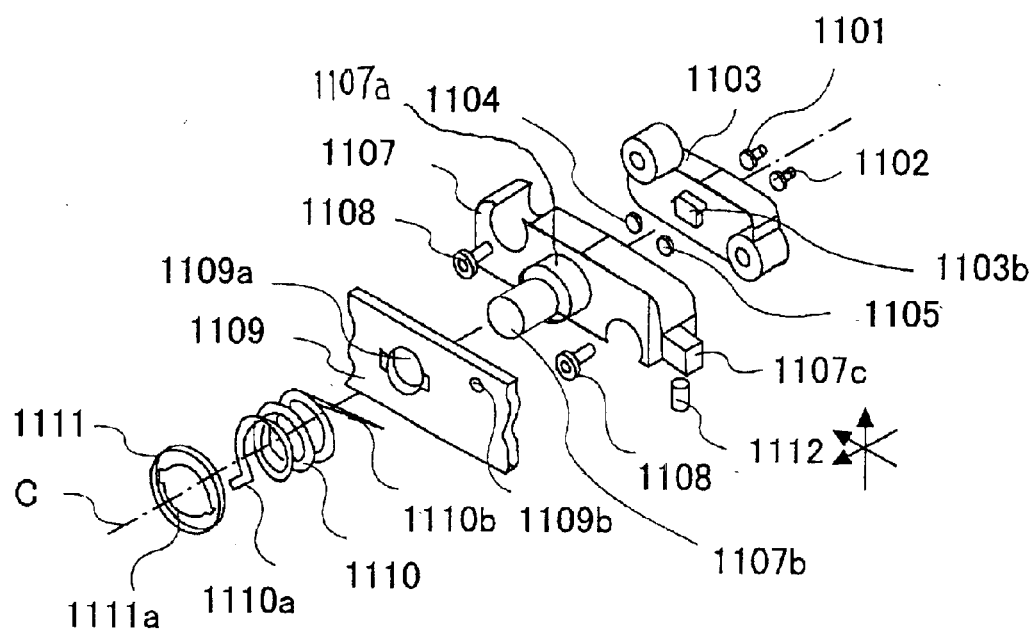
FIGS. 20A and 20B illustrate exploded perspective views of a holding mechanism for LD array and a light-source rotating mechanism, applicable to the third embodiment of the present invention.

In FIG. 19, illustration is omitted for the above-mentioned holding member of the LD arrays 111a and 111b. FIG. 20A shows one example of the same disclosed by Japanese laid-open patent application No. 2001-4941, and is a perspective view showing a light source device configuration in a multi-beam scanning device which uses two general-purpose semiconductor lasers as light sources, which can also be employed in the above-mentioned third embodiment of the present invention.

In the figure, the two semiconductor lasers 1101 and 1102 are press-fitted into fitting holes formed in a rear surface of an aluminum-die-cast base member 1103 with an interval of 8 mm therebetween (enabling parallel provision of coupling lenses). The coupling lenses 1104 and 1105 are fixed in a gap between the semiconductor lasers 1101, 1102 and an accompanying U-shaped support part 1103b with ultraviolet setting resin, after the X positions thereof are adjusted so that the laser beams emitted from the semiconductor lasers 1101 and 1102 may have desired divergent characteristics and Y, Z positions are adjusted so that they may have predetermined beam emitting directions. The semiconductor lasers 1101, 1102, base member 1103 and coupling lenses 1104, 1105 form a light-source device.

The base member 1103 is fixed onto a holding member 1107 by screw, a cylindrical outer surface 1107a (the center of which is coincident with the center C of the optical axes of the light source device) thereof is fitted into a fitting hole 1109a of a side wall 1109 of an optical housing, and, thus, positioning is made. Then, the base member 1103 is pressed by a spring 1110 onto the side wall 1109 as a result of a ring-shaped pressing member 1111 being engaged by a flange part 1107b. Further, a standing and bending part 1110a of the spring 1110 is engaged with a hole 1111a of the pressing member 1111, an arm 1110b at the opposite end thereof is engaged with a projection 1109b of the side wall 1109, and, thus, clockwise twisting force is generated. Thereby, a rotation-stopping part 1107c of the holding member 1107 is made be pressed onto an adjusting screw 1112. Then, by the adjusting screw 1112, the rotation adjustment approximately about the optical axes is made possible. Such a rotation approximately about the optical axes is called '$\gamma$ rotation' as mentioned above. The adjustment screw 1112 is held by a thread formed in the side wall 1109.

Figure 20B:
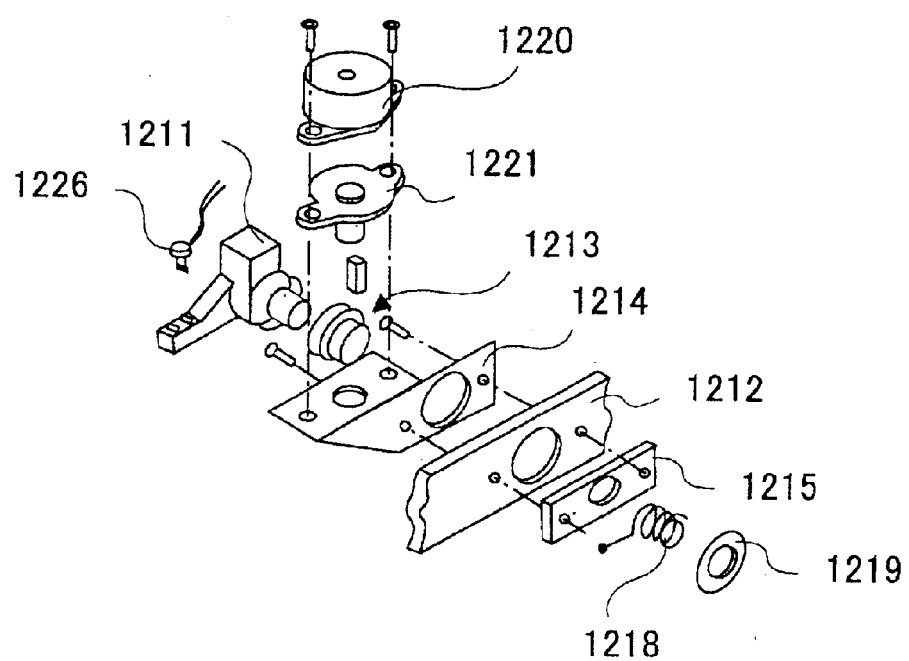

FIG. 20B shows an exploded perspective view of a mechanism for performing the $\gamma$ rotation of the light source device shown in FIG. 20A also disclosed by Japanese laid-open patent application No. 2001-4941. As shown in the figure, the mechanism rotates the light-source device 1211 with respect to the housing 1212 of the multi-beam scanning device, and, includes a sliding member 1213, a motor bracket 1214, the pressing plate 1215, the spring 1218, the sprint pressing plate 1219, a stepper motor 1220, guides 1221 and a switch 1226.

As in the above-described structure shown in FIGS. 20A and 20B, in the third embodiment of the present invention, the LD arrays 111a and 111b are fixed to the holding member by a press-fit manner. However, instead, the same may be fixed by another method, for example, a method of using a pressing plate together with fixing screws. Further, the coupling lenses 112a and 112b are fixed onto a U-shaped projection provided on the holding member by using ultra-violet setting adhesive or the like. However, instead, for example, the coupling lenses 112a and 112b may be fixed inside of a lens cell having a male thread, and this is screwed into a female thread part provide in the holding member, for example.

The two LD arrays 111a and 111b fixed and held as mentioned above are disposed away from one another along the main scanning direction, and the laser beams having undergone the coupling functions of the coupling lenses 112a and 112b (namely, optical axes of the respective two LD arrays 111a and 111b) cross mutually near the deflection reflective surface of the polygon mirror 114. By configuring as described above, it becomes possible to reduce the deviation in optical characteristics of the beam spots on the to-be-scanned surface 116 from both the LD arrays 111a and 111b. The crossing angle is set as 2$\theta$.

Figure 21:
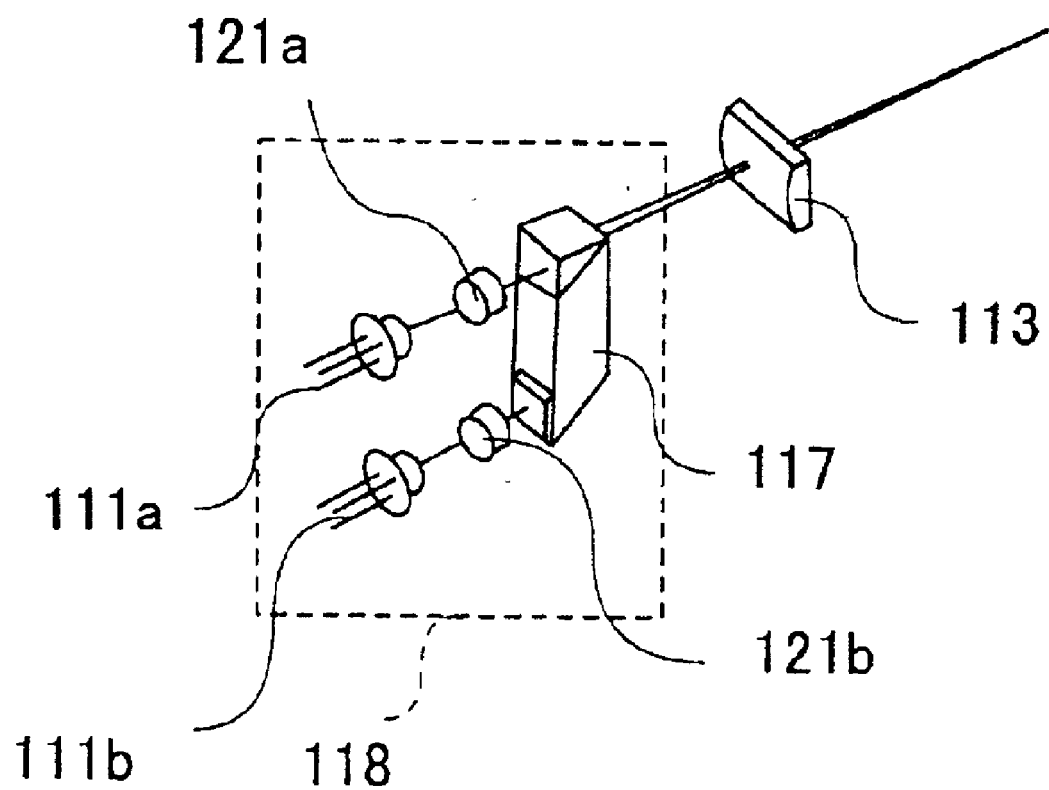
FIG. 21 shows a perspective view of another configuration example of a light-source device applicable to the third embodiment.

The eight laser beams emitted from the light source device 118 are imaged along the main scanning direction as long images along the sub-scanning direction on the deflection reflective surface of the polygon mirror 114 by the function of the cylindrical lens 113, and after the deflection/reflection is carried out, the scanning optical system 115 causes the laser beams to scan the to-be-scanned surface 116 (photoconductor drum) at a uniform velocity. In the light source device 118, the above-mentioned angle 2$\theta$ can be made smaller by configuring, as shown in FIG. 21, i.e., to employ a beam combining prism 117. Thereby, the deviation in optical characteristics of the beam spots on the to-be-scanned surface 1167 from both the LD arrays 111a and 111b can be further reduced.

Figure 22A:
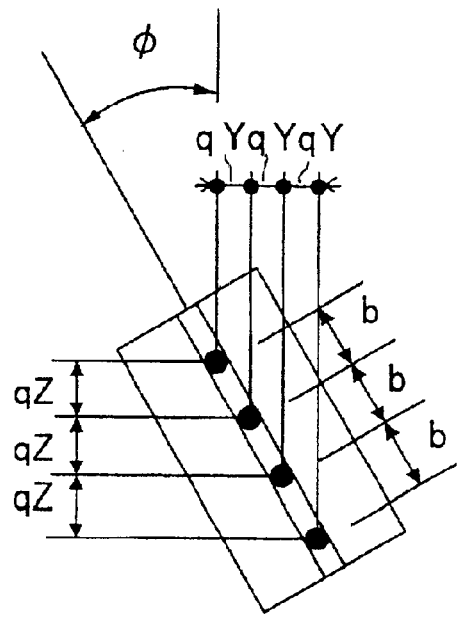
FIGS. 22A and 22B illustrate an arrangement angle (inclination angle) of light-emitting points on an LD array with respect to a sub-scanning direction (A), and the same of beam spots on a to-be-scanned surface (B) in the third embodiment.
Figure 22B:
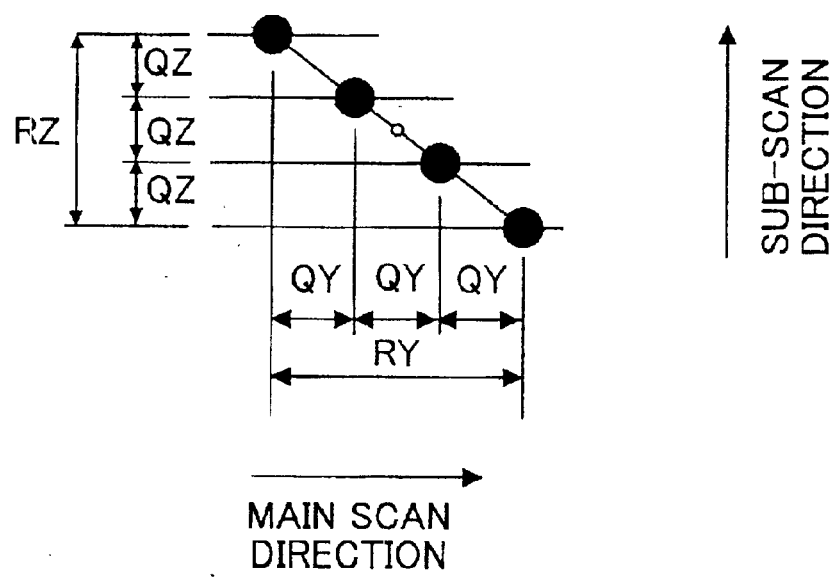

The LD arrays 111a and 111b (light-emitting point interval: q) are disposed with inclination angle (arrangement angle) φ with respect to the sub-scanning direction as shown in FIG. 22A. In this case, on the to-be-scanned surface 116, through magnification function of the optical system (mY on the main scanning direction; mZ on the sub-scanning direction), as shown in FIG. 22B, the interval (QY, QZ) between adjacent beam spots is expressed as follows:

$$QY = q \times \sin\phi \times mY$$

$$QZ = q \times \cos\phi \times mZ$$

Therefore, the interval (RY, RZ) of the farthest beam spots on each LD array is expressed as follows:

$$RY = (n-1)QY = (n-1) \times q \times \sin\phi \times mY$$

$$RZ = (n-1)QZ = (n-1) \times q \times \cos\phi \times mZ$$

Generally speaking, it is difficult to change the magnification (and focal length) of a scanning optical system in case a multi-beam scanning device employs an existing scanning optical system (the optical system subsequent to the deflector is used as it is). However, desired magnification (mY and mZ) can be obtained by setting appropriately the focal length of an optical system (i.e., coupling lens and cylindrical lens) before the deflector relatively easier.

Figure 23A:
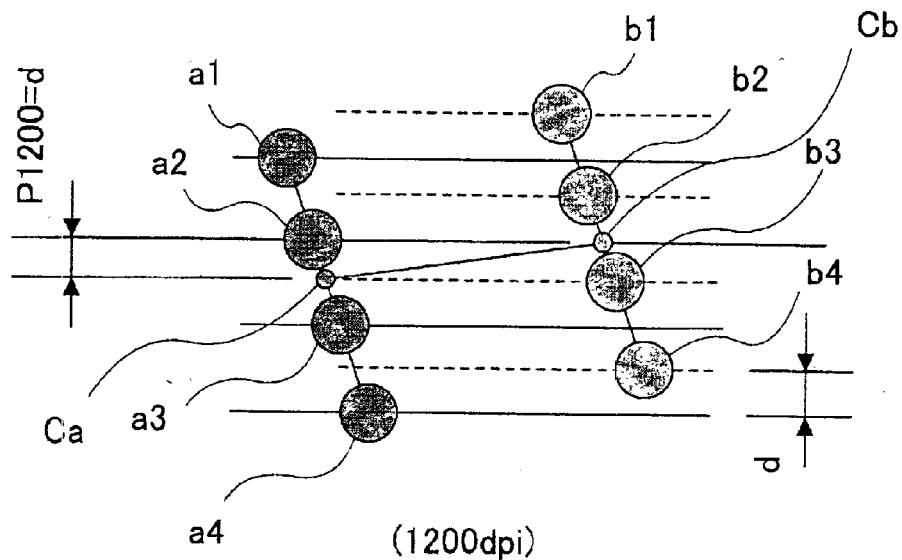
FIGS. 23A and 23B illustrate a scanning density switching operation through γ rotation according to the third embodiment of the present invention.
Figure 23B:
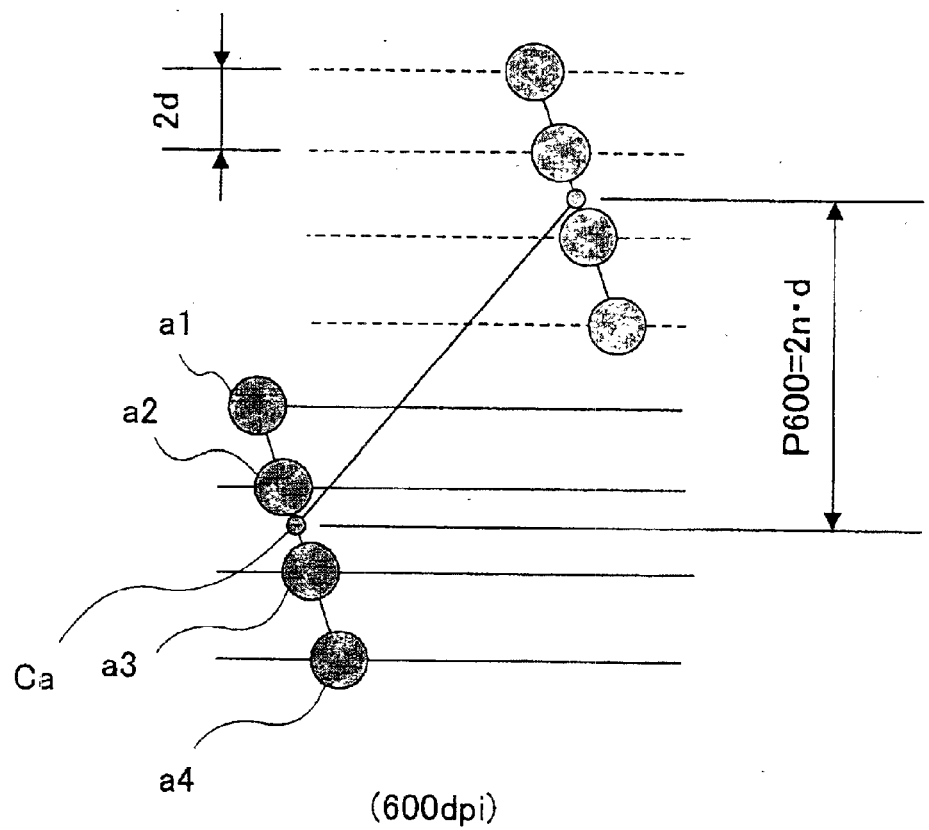

FIGS. 23A and 23B illustrate methods of placing beam spots on the to-be-scanned surface 116.

FIG. 23A shows a way of arranging alternately the beam spots of first LD array 111a, and the beam spots of the second LD array 111b. The sub-scanning direction component PZ of the distance (referred to as a center-to-center distance) between the central positions Ca and Cb of the beam spot arrangement of the first LD array 111a and second LD array 111b corresponds to one scanning line interval (d). Thus, the center-to-center distance at a time of 1200 dpi is set as P1200=d.

FIG. 23B shows a way of arranging the beam spots of the first LD array 111a, and the beam spots of the second LD array 111b, in series. The sub-scanning direction component PZ of the center-to-center distance between centers Ca and Cb of the respective beam spot arrangements of the LD arrays 111a and 111b corresponds to 2n·d.

Further, in the multi-beam scanning device of the third embodiment, the detection part 119 for detecting the synchronized signals for determining scanning start timing is provided. Then, for each of the LD arrays 111a and 111b, the above-mentioned synchronization signal is obtained from the laser beam emitted from one light-emitting point, and from the synchronized signal obtained from the laser beam from the one light-emitting point, the scanning start timing of the laser beams from the other light-emitting points are determined as being delay by specific times (delay times), in sequence. Thereby, it is possible to make scans with the respective laser beams starting from the same position (along the main scanning direction).

As mentioned above, the laser beams emitted from the LD arrays 111a and 111b cross near the deflection reflective surface of the polygon mirror 114 at the crossing angle 2θ. Accordingly, by rotating the light source device 118 configured as shown in FIG. 20A, about a rotational axis parallel to the optical axes of these laser beams according to the manner of γ rotation mentioned above, an optical axis shift along the sub-scanning direction of the laser beams which come out of the two LD arrays 111a and 111b is obtained, and, consequently, the sub-scanning direction component PZ of the above-mentioned center-to-center distance between the two central positions Ca and Cb of the beam spots on the to-be-scanned surface 116 can be appropriately adjusted. That is, the beam spot arrangement of FIG. 23A can be switched into that shown in FIG. 23B, and scanning density can thus be switched.

In the case of the example shown in the figures, switching between 1200 dpi and 600 dpi can be performed. In fact, in FIG. 23A, the interval between adjacent scanning lines is d=21.2 µm (scanning density is 1200 dpi), while the interval between adjacent scanning lines is 2d=42.3 µm (scanning density is 600 dpi) in FIG. 23B.

Figure 24:
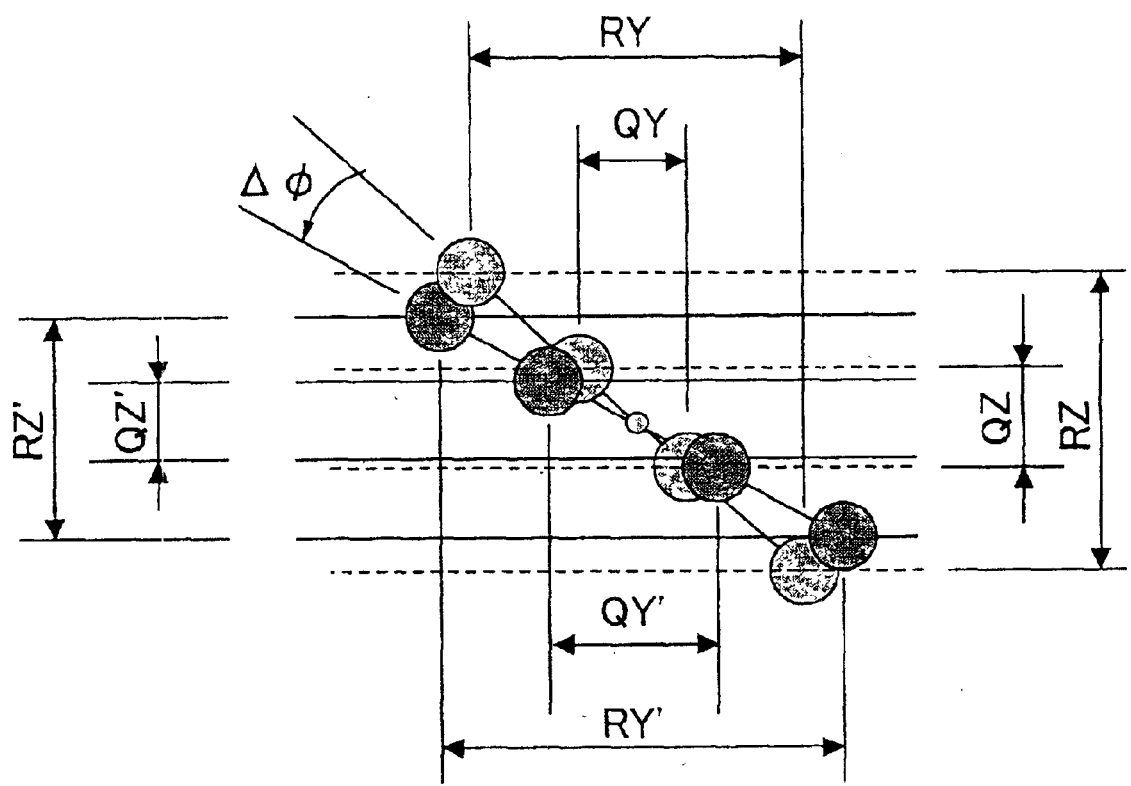
FIG. 24 illustrates change in beam spot arrangement on the to-be-scanned surface occurring due to the γ rotation of the light-source device (light-source unit) in the configuration of the third embodiment.

It is noted that, through the γ rotation of the light source device 118, the two LD arrays 111a and 111b are revolved as shown in FIGS. 23A and 23B, while each of the two LD arrays 111a and 111b rotates actually (although not clearly expressed in the figures). Therefore, as shown in FIG. 24, the beam spot arrangement (intervals along the sub-scanning direction (RZ) and main scanning direction (RY)) on the to-be-scanned surface 116 on each LD array is changed from the initial state.

When the amount or angle of γ rotation of the light source device 118 is assumed as γφ, the amount of change in the beam spot arrangement on the to-be-scanned surface 116 (the amount of change: ΔRY; the amount of change: ΔRZ, in the interval along the sub-scanning direction and the interval along the main scanning direction, respectively) will now be calculated. First, the center-to-center distance P along the sub-scanning direction shown in FIGS. 23A, 23B is expressed by $$P = 2 \times fcol \times \tan\theta \times \sin\gamma \times mZ \qquad (20)$$

Then, this formula (20) is differentiated with respect to (as Δφ=Δγ), $$\Delta P/\Delta\phi = 2 \times fcol \times \tan\theta \times \cos\gamma \times mZ \qquad (21)$$

Now, γ≈0. Then, it is assumed cos γ=1. Accordingly, from the formula (21), $$\Delta\phi = \Delta P/(2 \times fcol \times \tan\theta \times mZ) \qquad (22)$$

Further, $$\Delta P = P600 - P1200 \qquad (23)$$
$$= 2n \cdot d - d = (2n-1) \cdot d$$

Accordingly, by substituting the formula (23) for the formula (22), $$\Delta\phi = (2n-1) \cdot d / (2 \times \text{fcol} \times \tan\theta \times mz) \qquad (24)$$
$$= \{(2n-1)/2\} \times \{d/(\text{fcol} \times \tan\theta \times mz)\}$$

Then, as mentioned above, $$RY = (n-1) \times q \times \sin\phi \times mY$$

and this formula is differentiated with respect to φ, then, the absolute value thereof is obtained, i.e., $$\Delta RY = |(n-1) \times q \times \cos\phi \times mY \times \Delta\phi| \qquad (25)$$

Then, the formula (24) is substituted for the formula (25), thus, $$\Delta R = |(n-1) \times q \times \cos\phi \times mY \times \{(2n-1)/2\} \times \{d/(\text{fcol} \times \tan\theta \times mz)\}|$$
$$= |(n-1) \times (2n-1)/2\} \times \{(q \times \cos\phi \times mY \times d)/(\text{fcol} \times \tan\theta \times mz)\}|$$

Similarly, $$RZ=(n-1) \times q \times \cos\phi \times mY$$

is differentiated with respect to φ, the absolute value thereof is obtained, and then $$\Delta RZ=|(n-1) \times q \times \sin\phi \times mY \times \Delta\phi|$$

Thus, the formula (24) is substituted therefor, and, thus, $$\Delta\phi=\{(2n-1)/2 \times \{d/(fcol \times \tan\theta \times mZ)\}$$
$$\Delta RY=|\{(n-1) \times (2n-1)/2\} \times \{(q \times \cos\phi \times mY \times d)/(fcol \times \tan\theta \times mZ)\}|$$
$$\Delta RZ=|\{(n-1) \times (2n-1)/2\} \times \{(q \times \sin\phi \times d)/(fcol \times \tan\theta)\}|$$

In FIG. 24, $$QY'=QY+\Delta QY$$
$$RY'=RY+\Delta RY$$
$$QZ'=QZ-\Delta QZ$$
$$RZ'=RZ-\Delta RZ.$$

Assuming the specification of the above-mentioned third embodiment as shown in FIG. 25, $$\Delta\phi=0.7(°)$$
$$\Delta RY=2.8\ (\mu m)$$
$$\Delta RZ=4.5\ (\mu m)$$

Then, assuming that the multi-beam scanning device in the third embodiment is used as a multi-beam scanning device in an image formation apparatus using an electronic photograph process, it is assumed that permissible value of change amount in the beam spot arrangement (in case of scanning density switching) as ¼ the scanning line interval (=d/4). Then, $$d/4=5.3\ (\mu m)$$

Thus, for the main scanning direction (ΔRY) and for the sub-scanning direction (ΔRZ), the above-mentioned change amount on the beam spot arrangement falls within the permissible range. Accordingly, by satisfying the following requirements:

$$\Delta RY=|\{(n-1) \times (2n-1)/2\} \times \{(q \times \cos\phi \times mY \times d)/(fcol \times \tan\theta \times mZ)\}| \leq d/4 \quad (I)$$

$$\Delta RZ=|(n-1) \times (2n-1)/2\} \times \{(q \times \sin\phi \times d)/(fcol \times \tan\theta)\}|=d/4 \quad (II)$$

an output image by the image formation apparatus which uses the multi-beam scanning device in which the above conditional formulas (I) and (II) are satisfied can be a quality image.

As the right side of the above-mentioned conditional formulas (I) and (II) have smaller values, higher quality image can be obtained. However, it is also possible that a value of d/2 or less may be used instead of d/4, depending on particular requirements of required image quality, development, transfer and fixing conditions, and so forth.

Moreover, in a scanning density switching, the multi-beam scanning device which may preferably set up the delay time such that the scanning start position on each beam spot may be the same on the to-be-scanned surface 116 when the higher (scanning line interval is smaller) scanning density is applied/selected. Thus, a configuration is made such that the predetermined beam spot arrangement is properly obtained in the higher scanning density mode (1200 dpi), and, the above-mentioned amount of change (ΔRY, Δ RZ) occurs in the lower scanning density mode (600 dpi). As a result, in the higher scanning density mode in which higher-quality output image is obtained and thus the influence of the beam spot arrangement error has more remarkable on the output image, more precise beam spot arrangement, i.e., having less error, in both the main and sub-scanning directions, can be obtained.

According to the specification shown in FIG. 25, the main scanning direction component of the beam spot arrangement on each LD array is such that $$QY=q \times \sin(\phi) \times mY=0.197\ (mm)$$

And, thus, as this distance is very small, the synchronization signal may not be able to be individually detected for each of the four laser beams on each LD array depending on the scanning speed. Therefore, it may be that, the synchronization signal is detected only for one light-emitting point of the four as mentioned above, a specific time (delay time) is shifted from the synchronization signal in sequence for the other respective light-emitting points for setting up the scanning start timing therefor. On the other hand, the main scanning direction component PY of the center-to-center distance between the center positions Ca and Cb of the beam spot arrangements between the two LD arrays 111a and 111b is expressed as:

$$PY=FY \times (2\theta)=225 \times (5° \times 2\pi/360°)=19.6\ (mm)$$

Thereby, as this value is relatively large, it is easy to detect the synchronization signals for the both LD arrays, respectively.

A fourth embodiment of the present invention will now be described.

As a configuration of the fourth embodiment, a case where the specification shown in FIG. 26 is applied in the above-described third embodiment is discussed.

According to the fourth embodiment, the required rotation amount Δφ of the light source device 118 for switching of the scanning line density, change amount in the beam spot arrangement on the to-be-scanned surface 116 (ΔRY on the main scanning direction; ΔRZ on the sub-scanning direction) occurring due to the above-mentioned rotation of Δφ are as follows:

$$\Delta\phi=3.6(°)$$
$$\Delta RY=39.3\ (\mu m)$$
$$\Delta RZ=0.3\ (\mu m)$$

Thus, the main scanning direction component ΔRY=39.3 μm of the amount of change in the beam spot arrangement exceeds the above-mentioned permissible amount d/4=5.3 μm. On the other hand, as to the sub-scanning direction, no problem occurs as ΔRZ=0.3 μm is sufficiently smaller than the above-mentioned permissible value 5.3 μm.

Even in such a case, the scanning start position (along the main scanning direction) on each laser beam can be made uniform as a result of the delay time applied there being suitably set according to the switching of scanning density. The delay times for both the scanning densities (1200 dpi and 600 dpi) can be calculated in a design manner.

For example, assuming that the delay time applied to the higher scanning density mode (at the time of 1200 dpi) is T1200, while the delay time applied to the lower scanning density mode (at the time of 600 dpi) is T600, and the scanning speed is Vs, the amount of change ΔT in delay time to be applied at the time of a scanning density switching can be obtained as $$\Delta T = T600 - T1200 = \Delta QY/Vs.$$

Since $$\Delta QY = \Delta RY/(n-1) = 39.3/(4-1) = 13.1 \ (\mu m)$$

In case Vs=500 (m/s), for example, $$\Delta T = 26.2 \text{ (ns)}$$

Moreover, by providing a measure of detecting at least the main scanning direction component of the spot interval in the beam spot arrangement, it becomes possible to-determine the delay time to be applied more precisely according to the detection result.

Furthermore, when this multi-beam scanning device is used as a multi-beam scanning device in an image formation apparatus applying an electronic photographic process, a function such that a beam spot arrangement detection pattern can be obtained as an output image thereof may be provided. Then, an operator, such as a user or a service person, may determine the delay time to be applied before and after the scanning density switching operation by observing the above-mentioned beam spot arrangement detection pattern. Then, the thus-determined delay time to be applied may be input through an operation panel prepared in the main part of the machine.

Figure 27A:
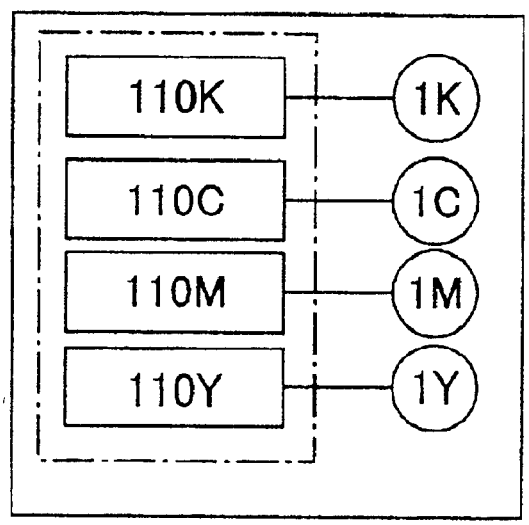
FIGS. 27A, 27B, 27C and 27D illustrate configuration examples of image formation apparatuses each applying any one of the embodiments of the present invention.
Figure 27B:
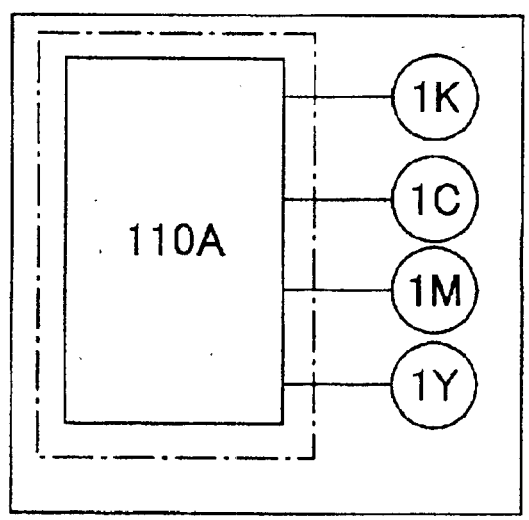
Figure 27C:
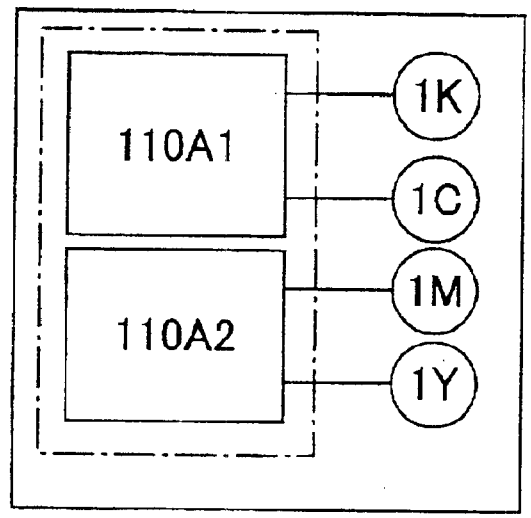
Figure 27D:
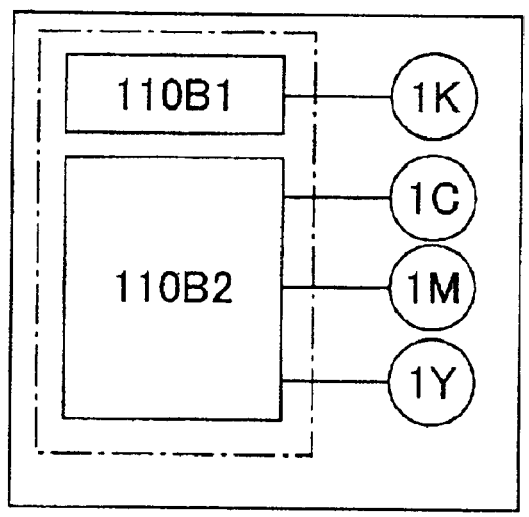

In an image formation apparatus, such as a digital color copying machine or a color printer, a so-called tandem type one, in which a plurality of photoconductor drums, 1K, 1C, 1M, and 1Y are arranged corresponding to respective color components (for example, black: K, cyan: C, magenta: M, and yellow: Y) in series along a direction along which an image recording medium (for example, paper) is conveyed is adopted in cases. In such a case, as shown in FIG. 27A, separate scanning devices (110K, 110C, 110M, 110Y) may be provided for the respective color components, or, alternatively, a common scanning device 110A may be provided as shown in FIG. 27B. Furthermore, it is also possible that, as shown in FIGS. 27C and 27D, two scanning devices 110A1, 110A2, or 110B1 and 110B2 may be provided. In such a configuration, it is possible to provide output images at a rate 4 times, as compared with a case where only a single photoconductor drum is used (in case of four color components, four times of writing operation should be made for each image formation). For more details on such a tandem-type machine, see U.S. patent application Ser. No. 09/956,900, filed on Sep. 21, 2001, by the same applicant, in particular, FIGS. 1–10 and associated description, the entire contents of which are hereby incorporated by reference.

In case a single beam comes out of each of the scanning devices 110K, 110C, 110M, and 110Y corresponding to the respective color components, a full color (four color components) image can be obtained by the image output apparatus which uses these scanning devices. In contrast thereto, a case is assumed in which at least one of the four scanning devices (for example, the scanning device for black component 110k) is of a four-beam multi-beam scanning device according to any of the above-mentioned embodiments of the present invention, and image formation is performed by using only this multi-beam scanning device in case. In this case, as compared with the above-mentioned case of obtaining a full color image, 4 times as high-density printing can be obtained. Alternatively, when the conveyance speed on a recording medium (and process speed) is increased 4 times, it becomes possible to increase image output number of sheets by 4 times.

Moreover, high resolution is required in many cases only for black component for obtaining a character/letter image part even at a case of obtaining a full color image as a whole. Accordingly, in addition to the above 4-beam multi-beam scanning device 110K (black), simultaneously the other single-beam scanning devices (110C, 110M, 110Y) are operated, and, thus, it becomes possible to obtain a high-definition output image effectively also for an image in which character/photograph/line drawing image parts are combined.

Various modification is possible for the present invention within a basic concept thereof, which are not limited to the above-mentioned embodiments. For example, although the present invention is applied to the color laser printer according to the embodiments, a multi-beam scanning device according to the present invention can also be applied as a laser writing optical system in an image formation apparatuses, such as a digital copier or a combined/composite machine including the functions of various apparatuses.

Further, the present invention is not limited to the above-described embodiments, and variations and modifications may be made without departing from the scope of the present invention.

The present application is based on Japanese priority applications. Nos. 2001-062928 and 2001-202309, filed on Mar. 7, 2001 and Jul. 3, 2001, respectively, the entire contents of which are hereby incorporated by reference.

What is claimed is:

1. A multi-beam scanning device, scanning a to-be-scanned surface with a plurality of laser beams simultaneously, comprising:

a light-source unit comprising a plurality of laser arrays, each comprising a plurality of light-emitting points, a corresponding plurality of coupling lenses coupling laser beams emitted from said plurality of laser arrays, respectively and a holding member integrally holding said plurality of laser arrays and plurality of coupling lenses rotatably approximately about optical axes of said laser arrays; and a scanning optical system deflecting the laser beams emitted from said light-source unit and imaging them onto the to-be-scanned surface, wherein said light-source unit and scanning optical system are configured so that the following equation be satisfied:

$$AY = |q \times \cos \phi \times mY \times (n-1)/(2 \times fcol \times \tan \theta \times \cos \gamma \times mZ)| \leq 0.1$$

where:

n denotes the number of light-emitting points on each laser array;

q denotes an interval between each adjacent ones of the light-emitting points on each laser array;

φ denotes an inclination angle of each laser array with respect to a sub-scanning direction;

mY denotes a magnification of said scanning optical system on main scanning direction;

mZ denotes a-magnification of said scanning optical system on sub-scanning direction;

fcol denotes the focal length of each coupling lens;

θ denotes half a crossing angle at which the laser beams emitted from said plurality of laser arrays cross therebetween;

γ denotes a maximum required rotational angle of said light-source unit in case of adjustment.

2. The multi-beam scanning device as claimed in claim 1, wherein the number of laser arrays on said light-source unit is two.

3. The multi-beam scanning device as claimed in claim 1, wherein the inclination angle of each laser array can be adjusted individually.

4. The multi-beam scanning device as claimed in claim 1, wherein each laser array is rotatably held by said holding member.

5. The multi-beam scanning device as claimed in claim 1, wherein said light-source unit and scanning optical system are configured such that a ratio A0 between a main-scanning-directional component and a sub-scanning-direction component of a change in beam-spot interval on the to-be-scanned surface occurring according to change in the inclination angle of each laser array satisfies the following equation:

$$\tfrac{1}{3} \leq A0 \leq 3$$

where $$A0 = |(mY/mZ) \times \tan \phi|$$

Where:

mY denotes a magnification of said scanning optical system on main scanning direction; and mZ denotes a magnification of said scanning optical system on sub-scanning direction.

6. An image formation apparatus comprising the multi-beam scanning device as claimed in claim 1.

7. An image formation apparatus comprising:

a plurality of photoconductor members to provide to-be-scanned surfaces; and the multi-beam scanning device claimed in claim 1 scanning at least one of said to-be-scanned surfaces.

8. A multi-beam scanning device, scanning a to-be-scanned surface with a plurality of laser beams simultaneously, comprising:

a light-source unit comprising a plurality of laser arrays, each comprising a plurality of light-emitting points, a corresponding plurality of coupling lenses coupling laser beams emitted from said plurality of laser arrays, and a holding member integrally holding said plurality of laser arrays and plurality of coupling lenses rotatably approximately about optical axes of said laser arrays; and a scanning optical system deflecting the laser beams emitted from said light-source unit and imaging them onto the to-be-scanned surface, wherein said light-source unit and scanning optical system are configured so that the following equation be satisfied:

$$AZ = |q \times \sine \phi \times (n-1)/(2 \times fcol \times \tan \theta \times \cos \gamma)| \leq 0.1$$

where:

n denotes the number of light-emitting points on each laser array;

q denotes an interval between each adjacent ones of the light-emitting points on each laser array;

φ denotes an inclination angle of each laser array with respect to a sub-scanning direction;

fcol denotes the focal length of each coupling lens;

θ denotes half a crossing angle at which the laser beams emitted from said plurality of laser arrays cross therebetween; and γ denotes a maximum required rotational angle of said light-emitting unit in case of adjustment.

9. The multi-beam scanning device as claimed in claim 8, wherein the number of laser arrays on said light-source unit is two.

10. The multi-beam scanning device as claimed in claim 8, wherein the inclination angle of each laser array can be adjusted individually.

11. The multi-beam scanning device as claimed in claim 8, wherein each laser array is rotatably held by said holding member.

12. The multi-beam scanning device as claimed in claim 8, wherein said light-source unit and scanning optical system are configured such that a ratio A0 between a main-scanning-directional component and a sub-scanning-direction component of a change in beam-spot interval on the to-be-scanned surface occurring according to change in the inclination angle of each laser array satisfies the following equation:

$$\tfrac{1}{3} \leq A0 \leq 3$$

where $$A0 = |(mY/mZ) \times \tan \phi|$$

Where:

mY denotes a magnification of said scanning optical system on main scanning direction; and mZ denotes a magnification of said scanning optical system on sub-scanning direction.

13. An image formation apparatus comprising the multi-beam scanning device as claimed in claim 8.

14. An image formation apparatus comprising:

a plurality of photoconductor members to provide to-be-scanned surfaces; and the multi-beam scanning device claimed in claim 8 scanning at least one of said to-be-scanned surfaces.

15. A multi-beam scanning device, scanning a to-be-scanned surface with a plurality of laser beams simultaneously, comprising:

a light-source unit comprising a plurality of laser arrays, each comprising a plurality of light-emitting points, a corresponding plurality of coupling lenses coupling laser beams emitted from said plurality of laser arrays, respectively, and a holding member integrally holding said plurality of laser arrays and plurality of coupling lenses rotatably approximately about optical axes of said laser arrays;

a scanning optical system deflecting the laser beams emitted from said light-source unit and imaging them onto the to-be-scanned surface; and a part switching a scanning density on the to-be-scanned surface by rotating said light-source unit approximately about the optical axes of said laser arrays.

16. The multi-beam scanning unit as claimed in claim 15, further comprising a detecting part detecting a synchronization signal for determining a scanning start timing, wherein:

said detecting part obtains the synchronization signal from a laser beam emitted from one of the light-emitting points of each of the laser arrays; and scanning start timings on the other light-emitting points are determined as a result of shifting by specific delay times from the synchronization signal thus obtained.

17. The multi-beam scanning device as claimed in claim 15, wherein the number of the laser arrays provided is two.

18. The multi-beam scanning device as claimed in claim 15, wherein said light-source unit and scanning optical system are configured so that the following formula be satisfied:

$$\Delta RY = |\{(n-1)\times(2n-1)/2\}\times\{(q\times\cos\phi\times mY\times d)/(fcol\times\tan\theta\times mZ)\}| \leq d/4$$

where:

d denotes a scanning line interval on the to-be-scanned surface;

n denotes the number of light-emitting points on each laser array;

q denotes an interval between each adjacent ones of the light-emitting points one each laser array;

φ denotes an inclination angle of each laser array with respect to a sub-scanning direction;

mY denotes a magnification of said scanning optical system on main-scanning direction;

mZ denotes a magnification of said scanning optical system on sub-scanning direction;

fcol denotes the focal length of each coupling lens;

θ denotes half a crossing angle at which the laser beams emitted from said plurality of laser arrays cross therebetween; and ΔRY denotes the main-scanning-directional component of beam-spot interval between both ends of beam spots on the to-be-scanned surface for each laser array.

19. The multi-beam scanning device as claimed in claim 15, wherein said light-source unit and scanning optical system are configured so that the following formula be satisfied:

$$\Delta RZ = |\{(n-1)\times(2n-1)/2\}\times\{(q\times\sin\phi\times d)/(fcol\times\tan\theta)\}| \leq d/4$$

where:

d denotes a scanning line interval on the to-be-scanned surface;

n denotes the number of light-emitting points on each laser array;

q denotes an interval between each adjacent ones of the light-emitting points on each laser array;

φ denotes an inclination angle of each laser array with respect to a sub-scanning direction;

fcol denotes the focal length of each coupling lens;

θ denotes half a crossing angle at which the laser beams emitted from said plurality of laser arrays cross therebetween; and ΔRZ denotes the sub-scanning-directional component of beam-spot interval between both ends of beam spots on the to-be-scanned surface for each laser array.

20. The multi-beam scanning device as claimed in claim 15, wherein delay times applied on the respective beam spots for scanning start timing are determined such that scanning start timing is optimum in case where a higher scanning density is applied through said switching part.

21. The multi-beam scanning device as claimed in claim 15, wherein delay times applied on the respective beam spots for scanning start timing are variable according to the scanning density switched.

22. An image formation apparatus comprising the multi-beam scanning device as claimed in claim 15.

23. An image formation apparatus comprising:

a plurality of photoconductor members to provide to-be-scanned surfaces; and the multi-beam scanning device claimed in claim 15 scanning at least one of said to-be-scanned surfaces.

24. A multi-beam scanning device, scanning a to-be-scanned surface with a plurality of laser beams simultaneously, comprising:

light-source unit comprising a plurality of laser means, each comprising a plurality of light-emitting points, a corresponding plurality of coupling means for coupling laser beams emitted from said plurality of laser arrays, and a holding means for integrally holding said plurality of laser means and plurality of coupling means rotatably approximately about optical axes on the laser means; and a scanning optical system deflecting the laser beams emitted from said light-source unit and imaging them onto the to-be-scanned surface, wherein said light-source unit and scanning optical system are configured so that the following equation be satisfied:

$$\Delta Y = |q\times\cos\phi\times mY\times(n-1)/(2\times fcol\times\tan\theta\times\cos\gamma\times mZ)| \leq 0.1$$

where:

n denotes the number of light-emitting points on each laser means;

q denotes an interval between each adjacent ones of the light-emitting points on each laser means;

φ denotes an inclination angle of each laser means with respect-to a sub-scanning direction;

mY denotes a magnification of said scanning optical system on main scanning direction;

mZ denotes a magnification of said scanning optical system on sub-scanning direction;

fcol denotes the focal length of each coupling means;

θ denotes half a crossing angle at which the laser beams emitted from said plurality of laser means cross therebetween; and γ denotes a maximum required rotational angle of said light-emitting unit in case of adjustment.

25. The multi-beam scanning device as claimed in claim 24, wherein the number of laser means on said light-source unit is two.

26. The multi-beam scanning device as claimed in claim 24, wherein the inclination angle of each laser means can be adjusted individually.

27. The multi-beam scanning device as claimed in claim 24, wherein each laser means is rotatably held by said holding means.

28. The multi-beam scanning device as claimed in claim 24, wherein said light-source unit and scanning optical system are configured such that a ratio A0 between a main-scanning-directional component and a sub-scanning-direction component of a change in beam-spot interval on the to-be-scanned surface occurring according to change in the inclination angle of each laser means satisfies the following equation:

$$1/3 \leq A0 \leq 3$$

where $$A0 = |(mY/mZ) \times \tan \phi|$$

where:
- mY denotes a magnification of said scanning optical system on main scanning direction; and
- mZ denotes a magnification of said scanning optical system on sub-scanning direction.

29. An image formation apparatus comprising the multi-beam scanning device as claimed in claim 24.

30. An image formation apparatus comprising:
- a plurality of photoconductor members to provide to-be-scanned surfaces; and
- the multi-beam scanning device claimed in claim 24 scanning at least one of said to-be-scanned surfaces.

31. A multi-beam scanning device, scanning a to-be-scanned surface with a plurality of laser beams simultaneously, comprising:
- a light-source unit comprising a plurality of laser means, each comprising a plurality of light-emitting points, a corresponding plurality of coupling means for coupling laser beams emitted from said plurality of laser means, and holding means for integrally holding said plurality of laser means and plurality of coupling means rotatably approximately about optical axes on the laser means; and
- a scanning optical system deflecting the laser beams emitted from said light-source unit and imaging them onto the to-be-scanned surface,
- wherein said light-source unit and scanning optical system are configured so that the following equation be satisfied:

$$AZ = |q \times \sine \phi \times (n-1)/(2 \times fcol \times \tan \theta \times \cos \gamma)| \leq 0.1$$

where:
- n denotes the number of light-emitting points on each laser means;
- q denotes an interval between each adjacent ones of the light-emitting points on each laser means;
- φ denotes an inclination angle of each laser means with respect to a sub-scanning direction;
- fcol denotes the focal length of each coupling means;
- θ denotes half a crossing angle at which the laser beams emitted from said plurality of laser means cross therebetween; and
- γ denotes a maximum required rotational angle of said light-source unit in case of adjustment.

32. The multi-beam scanning device as claimed in claim 31, wherein the number of laser means on said light-source unit is two.

33. The multi-beam scanning device as claimed in claim 31, wherein the inclination angle of each laser means can be adjusted individually.

34. The multi-beam scanning device as claimed in claim 31, wherein each laser means is rotatably held by said holding means.

35. The multi-beam scanning device as claimed in claim 31, wherein said light-source unit and scanning optical system are configured such that a ratio A0 between a main-scanning-directional component and a sub-scanning-direction component of a change in beam-spot interval on the to-be-scanned surface occurring according to change in the inclination angle of each laser means satisfies the following equation;

$$1/3 \leq A0 \leq 3$$

where $$A0 = |(mY/mZ) \times \tan \phi|$$

Where:
- mY denotes a magnification of said scanning optical system on main scanning direction; and
- mZ denotes a magnification of said scanning optical system on sub-scanning direction.

36. An image formation apparatus comprising the multi-beam scanning device as claimed in claim 31.

37. An image formation apparatus comprising:
- a plurality of photoconductor members to provide to-be-scanned surfaces; and
- the multi-beam scanning device claimed in claim 31 scanning at least one of said to-be-scanned surfaces.

38. A multi-beam scanning device, scanning a to-be-scanned surface with a plurality of laser beams simultaneously, comprising:
- a light-source unit comprising a plurality of laser means, each comprising a plurality of light-emitting points, a corresponding plurality of coupling means coupling laser beams emitted from said plurality of laser means, and holding means integrally holding said plurality of laser means and plurality of coupling means rotatably approximately about optical axes on the laser means;
- a scanning optical system deflecting the laser beams emitted from said light-source unit and imaging them onto the to-be-scanned surface; and
- means for switching a scanning density on the to-be-scanned surface by rotating said light-source unit approximately about the optical axes of the laser means.

39. The multi-beam scanning unit as claimed in claim 38, further comprising detecting means for detecting a synchronization signal for determining a scanning start timing,
wherein:
- said detecting means obtains the synchronization signal from a laser beam emitted from one of the light-emitting points of each laser means; and
- scanning start timings on the other light-emitting points are determined as a result of shifting by specific delay times from the synchronization signal thus obtained.

40. The multi-beam scanning device as claimed in claim 38, wherein the number of laser means provided is two.

41. The multi-beam scanning device as claimed in claim 38, wherein said light-source unit and scanning optical system are configured so that the following formula be satisfied:

$$\Delta RY = |\{(n-1) \times (2n-1)/2\} \times \{(q \times \cos \phi \times mY \times d)/(fcol \times \tan \theta \times mZ)\}| \leq d/4$$

where:
- d denotes a scanning line interval on the to-be-scanned surface;
- n denotes the number of light-emitting points on each laser means;
- q denotes an interval between each adjacent ones of the light-emitting points on each laser means;

φ denotes an inclination angle of each laser means with respect to a sub-scanning direction;

mY denotes a magnification of said scanning optical system on main scanning direction;

mZ denotes a magnification of said scanning optical system on sub-scanning direction;

fcol denotes the focal length of each coupling means;

θ denotes half a crossing angle at which the laser beams emitted from said plurality of laser means cross therebetween; and ΔRY denotes the main-scanning-directional component of beam-spot interval between both ends of beam spots on the to-be-scanned surface for each laser means.

42. The multi-beam scanning device as claimed in claim 38, wherein said light-source unit and scanning optical system are configured so that the following formula be satisfied:

$$\Delta RZ = |\{(n-1) \times (2n-1)/2\} \times \{(q \times \sin \phi \times d)/(fcol \times \tan \theta)\}| \leq d/4$$

where:

d denotes a scanning line interval on the to-be-scanned surface;

n denotes the number of light-emitting points on each laser means;

q denotes an interval between each adjacent ones of the light-emitting points on each laser means;

φ denotes an inclination angle of each laser means with respect to a sub-scanning direction;

mZ denotes a magnification of said scanning optical system on sub-scanning direction;

fcol denotes the focal length of each coupling means;

θ denotes half a crossing angle at which the laser beams emitted from said plurality of laser means cross therebetween; and ΔRZ denotes the sub-scanning-directional component of beam-spot interval between both ends of beam spots on the to-be-scanned surface from each laser means.

43. The multi-beam scanning device as claimed in claim 38, wherein delay times applied on the respective beam spots for scanning start timing are determined such that scanning start timing is optimum in case where a higher scanning density is applied through said switching part.

44. The multi-beam scanning device as claimed in claim 38, wherein delay times applied on the respective beam spots for scanning start timing are variable according to the scanning density switched.

45. An image formation apparatus comprising the multi-beam scanning device as claimed in claim 38.

46. An image formation apparatus comprising:

a plurality of photoconductor members to provide to-be-scanned surfaces; and the multi-beam scanning device claimed in claim 38 scanning at least one of said to-be-scanned surfaces.

* * * * *